(12) United States Patent
Tsukamoto

(10) Patent No.: US 9,840,153 B2
(45) Date of Patent: Dec. 12, 2017

(54) NON-CONTACT POWER SUPPLY SYSTEM AND NON-CONTACT POWER SUPPLY DEVICE FOR CHARGING A VEHICLE BATTERY

(71) Applicant: Nissan Motor Co., Ltd., Yokohama-shi, Kanagawa (JP)

(72) Inventor: Yukinori Tsukamoto, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 196 days.

(21) Appl. No.: 14/778,385

(22) PCT Filed: Mar. 24, 2014

(86) PCT No.: PCT/JP2014/058091
§ 371 (c)(1),
(2) Date: Sep. 18, 2015

(87) PCT Pub. No.: WO2014/157091
PCT Pub. Date: Oct. 2, 2014

(65) Prior Publication Data
US 2016/0280077 A1 Sep. 29, 2016

(30) Foreign Application Priority Data
Mar. 29, 2013 (JP) ................. 2013-072228

(51) Int. Cl.
*B60L 11/18* (2006.01)
*B60L 3/00* (2006.01)
*B60L 3/04* (2006.01)

(52) U.S. Cl.
CPC ........... *B60L 11/182* (2013.01); *B60L 3/0069* (2013.01); *B60L 3/04* (2013.01); *B60L 11/1805* (2013.01);
(Continued)

(58) Field of Classification Search
CPC B60L 11/182; B60L 11/1833; B60L 11/1861; B60L 3/0069; B60L 2230/16
(Continued)

(56) References Cited

U.S. PATENT DOCUMENTS 9,656,558 B2 * 5/2017 Weber ................. B60L 11/1811
2012/0306439 A1 * 12/2012 Ichikawa .............. B60L 11/123
320/108

(Continued)

FOREIGN PATENT DOCUMENTS

EP 2 555 379 A1 2/2013
JP 2011-254593 A 12/2011
(Continued)

OTHER PUBLICATIONS

GM Advanced Technology Vehicles, "Electric Vehicle Charger WM7200 Inductive Charger Owner's Manual", May 2, 2012, California, USA, URL:http://www.evchargernews.com/miscfiles/gm atv wm7200 owners manual.pdf.

*Primary Examiner* — Daniel Kessie
(74) *Attorney, Agent, or Firm* — Global IP Counselors, LLP

(57) ABSTRACT

A power supply device supplies power from a power transmission coil to a power reception coil of a vehicle in a non-contact manner. The power supply device has a communication unit that receives a startup signal for activating the power supply device. A notification unit notifies a state of the power supply device. A controller controls the notification unit based on a detection result of a detection unit. The detection unit detects a non-contact power supply possible state, in which power can be supplied from the power transmission coil in a non-contact manner. The controller sets a notification state of the notification unit to a first notification state, when the non-contact power supply possible state is detected, and sets the notification state of the
(Continued)

notification unit to a state that is different from the first notification state, when the non-contact power supply possible state is not detected.

15 Claims, 14 Drawing Sheets

(52) U.S. Cl.
CPC ....... B60L 11/1824 (2013.01); B60L 11/1833 (2013.01); B60L 11/1835 (2013.01); B60L 11/1838 (2013.01); B60L 11/1846 (2013.01); B60L 11/1861 (2013.01); B60L 2210/30 (2013.01); B60L 2210/40 (2013.01); B60L 2230/16 (2013.01); B60L 2240/12 (2013.01); B60L 2240/30 (2013.01); B60L 2240/545 (2013.01); B60L 2240/547 (2013.01); B60L 2240/549 (2013.01); B60L 2250/10 (2013.01); B60L 2250/16 (2013.01); Y02T 10/7005 (2013.01); Y02T 10/705 (2013.01); Y02T 10/7044 (2013.01); Y02T 10/7088 (2013.01); Y02T 10/7241 (2013.01); Y02T 90/121 (2013.01); Y02T 90/122 (2013.01); Y02T 90/125 (2013.01); Y02T 90/127 (2013.01); Y02T 90/128 (2013.01); Y02T 90/14 (2013.01); Y02T 90/16 (2013.01); Y02T 90/163 (2013.01); Y02T 90/169 (2013.01); Y04S 30/14 (2013.01)

(58) Field of Classification Search
USPC .......................................................... 307/104
See application file for complete search history.

(56) References Cited

U.S. PATENT DOCUMENTS

| 2013/0181669 | A1 | 7/2013 | Kawasaki | |
|---|---|---|---|---|
| 2014/0239735 | A1* | 8/2014 | Abe | H02J 17/00 |
| | | | | 307/104 |
| 2014/0354041 | A1* | 12/2014 | Yoshi | H02J 7/025 |
| | | | | 307/9.1 |

FOREIGN PATENT DOCUMENTS

| JP | 2012-35789 A | 2/2012 |
|---|---|---|
| JP | 2012-208685 A | 10/2012 |
| JP | 2013-243929 A | 12/2013 |
| KR | 10-2011-0073104 A | 6/2011 |
| KR | 10-2012-0088162 A | 8/2012 |
| WO | 2012/042902 A1 | 4/2012 |
| WO | 2012/169197 A1 | 12/2012 |
| WO | 2012164973 A1 | 12/2012 |
| WO | 2013/035853 A1 | 3/2013 |

* cited by examiner

| RECEPTION ORDER | POWER PATTERN | POWER SUPPLY DEVICE ID |
|---|---|---|
| 1 | I | GC_A |
| 2 | II | GC_B |
| 3 | III | |
| 4 | IV | |

FIG. 4

NON-CONTACT POWER SUPPLY SYSTEM AND NON-CONTACT POWER SUPPLY DEVICE FOR CHARGING A VEHICLE BATTERY

This application is a U.S. National stage application of International Application No. PCT/JP2014/058091, filed Mar. 24, 2014, which claims priority to Japanese Patent Application No. 2013-072228 filed in Japan on Mar. 29, 2013. The entire disclosure of Japanese Patent Application No. 2013-072228 is hereby incorporated herein by reference.

BACKGROUND

Field of the Invention

The present invention relates to a non-contact power supply system and a power supply device.

Background Information

A power supply system of an electric vehicle that supplies power in a non-contact manner from a power supply device provided on the ground to an electric vehicle, in which a vehicle detection unit for determining whether or not the electric vehicle has entered a chargeable area is provided in the power supply device, and communication is established with the electric vehicle and the power supply device by wireless communication after the sensor detects that the electric vehicle has entered a chargeable area, to supply power from a power supply unit of the power supply device to a power reception unit of the electric vehicle has been disclosed. (See, e.g., International Publication No. 2012-042902).

SUMMARY

However, in the system described above, the system of the power supply device is not activated until after the vehicle enters a chargeable area; as a result, there is a problem that the user cannot grasp the state of the power supply device before parking the vehicle in the chargeable area.

The problem to be solved by the present invention is to provide a power supply device or a non-contact power supply system in which the user can grasp the state of the power supply device before parking the vehicle in a chargeable area.

The present invention solves the problem by receiving a startup signal for activating a power supply device by wireless communication, detecting the possible state of non-contact power supply which represents a state in which power can be supplied in a non-contact manner from a power transmission coil, causing a notification means to make a notification in a first notification state when detecting a non-contact power supply possible state, and setting the notification state of the notification means to a state that is different from the first notification state described above, when not detecting a non-contact power supply possible state.

Since the state of the power supply device is notified after activating the power supply device by wireless communication, the present invention achieves the effect that the user can grasp the state of the power supply device before parking the vehicle in a chargeable area.

BRIEF DESCRIPTION OF THE DRAWINGS

Referring now to the attached drawings which form a part of this original disclosure.

FIG. 4 is a schematic view of a power pattern list that is generated on the vehicle side in FIG. 1.

DETAILED DESCRIPTION OF THE EMBODIMENTS

Embodiments of the present invention will be explained below based on the drawings.

First Embodiment

Figure 1:
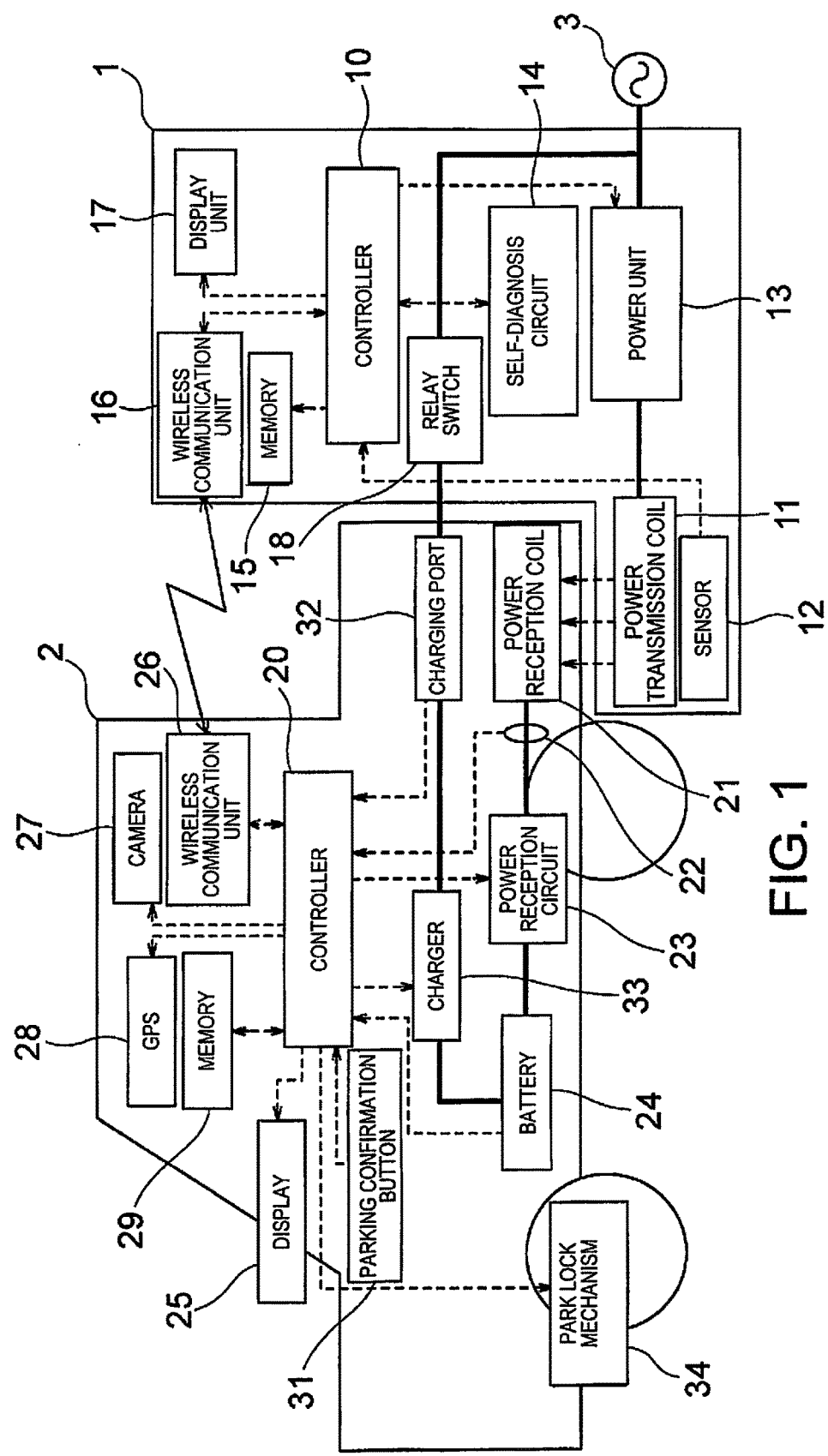
FIG. 1 is a control block diagram of a non-contact power supply system according to an embodiment of the present invention.

FIG. 1 is a block diagram of a non-contact power supply system according to an embodiment of the present invention. The non-contact power supply system of the present embodiment supplies power in a non-contact manner from a power transmission coil of a power supply device provided on the ground side to a power reception coil on the vehicle side, by means of at least a magnetic coupling. The system then charges the battery of the vehicle by the power that is received by the power reception coil. The non-contact power supply system is a system that is capable of charging by two systems: a system according to non-contact power supply and a system according to contact power supply. In a contact power supply system method, a charging cable is connected between a power supply device and a charging port of a vehicle.

Non-contact power supply systems are provided to parking facilities such as parking spaces of homes and shared facilities such as a parking space along a highway. A non-contact power supply system comprises a vehicle 2 and a power supply device 1. The power supply device 1 is provided to a parking space for parking a vehicle 2, and is a ground side unit that supplies power by non-contact power supply between coils, when the vehicle 2 is parked in a predetermined parking position. The vehicle 2 is a vehicle 2, such as an electric vehicle or a plug-in hybrid vehicle, which is capable of charging a battery that is provided in the vehicle by an external power source.

The configuration of the power supply device 1 and the vehicle 2, which configure the non-contact power supply system, will be described below. In the present embodiment, a description will be given of an electric vehicle as the vehicle 2. In FIG. 1, the dotted arrows represent respective signal lines between controllers 10 and 20, and the configuration inside the power supply device 1 and the configuration inside the vehicle 2, while the thick lines represent power lines when charging a battery 24 with the power of an AC power source 3, representing power lines of a contact power supply system and power lines of a non-contact power supply system.

The power supply device 1 comprises a controller 10, a power transmission coil 11, a sensor 12, a power unit 13, a self-diagnosis circuit 14, a memory 15, a wireless communication unit 16, a display unit 17, and a relay switch 18.

The controller 10 is a main controller for controlling the entire power supply device 1. The configuration of the controller 10 will be described below.

The power transmission coil 11 is a parallel circular-shaped coil for supplying power in a non-contact manner to a power reception coil 21, which is provided on the vehicle 2 side, and is provided in a parking space in which is provided the non-contact power supply device of the present embodiment. The sensor 12 is a sensor for detecting the relative position of the power reception coil 21 with respect to the power transmission coil 11, and is configured by, for example, an image sensor or an infrared sensor of a camera. The detection values of the sensor 12 are outputted to the controller 10.

The power unit 13 is a circuit for converting the AC power that is transmitted from an AC power source 3 to a high frequency AC power and transmitting the same to the power transmission coil 11, comprising a rectifier, a power factor correction circuit (PFC (Power Factor Correction) circuit), an inverter, and a sensor for detecting the output value to the power transmission coil 11. The power unit 13 outputs the desired power to the power transmission coil 11 by having a switching element provided to the inverter PWM-controlled by the controller 10.

The self-diagnosis circuit 14 is a circuit for diagnosing abnormalities such as a ground fault of the non-contact power supply system including the wiring from the power unit 13 and the AC power source 3 to the power transmission coil 11, a disconnection in the wiring, a detection failure of the sensor 12, and a ground fault of the contact power supply system. The diagnosis results of the self-diagnosis circuit 14 are outputted to the controller 10.

The memory 15 is a recording medium for recording identification information (ID) that is provided to each power supply device 1 in advance, and information that is transmitted from the vehicle 2 side. The wireless communication unit 16 is a transceiver that performs bidirectional communication with a wireless communication unit 26 that is provided on the vehicle 2 side. A frequency that is different from the frequency that is used in vehicle peripherals, such as intelligence keys, is set as the communication frequency between the wireless communication unit 16 and the wireless communication unit 26 so that vehicle peripherals are less susceptible to interference by the communication even if communication is performed between the wireless communication unit 16 and the wireless communication unit 26. For example, various wireless LAN systems are used for the communication between the wireless communication unit 16 and the wireless communication unit 26.

The display unit 17 is a display device for notifying the state of the power supply device 1 to the outside, and is configured from a lamp or a display, etc. The relay switch 18 is provided to the wiring that configures the contact power supply system, and is a switch for switching between ON and OFF based on the control of the controller 10. When charging the battery by contact power supply, the relay switch 18 is turned ON.

The configuration of the vehicle 2 is described next. The vehicle 2 comprises a controller 20, a power reception coil 21, a sensor 22, a power reception circuit 23, a battery 24, a display 25, a wireless communication unit 26, a camera 27, a GPS 28, a memory 29, a parking confirmation button 31, a charging port 32, a charger 33, and a park lock mechanism 34.

The controller 20 is not limited to the charging control when charging the battery 24, and performs various controls in the EV system of a vehicle.

The power reception coil 21 is provided on the bottom surface (chassis), etc., of the vehicle 2 between the rear wheels. Then, when the vehicle 2 is parked in a predetermined parking position, the power reception coil 21 is positioned above the power transmission coil 11, while maintaining the distance from the power transmission coil 11. The power reception coil 21 is a circular shape coil that is parallel to the surface of the parking space.

The sensor 22 is a sensor for detecting the current and the voltage that is outputted from the power reception coil 21 to the battery 24. The detection value of the sensor 22 is outputted to the controller 20. The power reception circuit 23 is connected between the power reception coil 21 and the battery 24, and comprises a circuit and a relay switch for converting the AC power that is received by the power reception coil to DC power. The relay switch switches between ON and OFF based on a control of the controller 20. When charging the battery 24 by a non-contact power supply, the relay switch is turned ON.

The battery 24 is a secondary battery that outputs, via an inverter that is not diagrammed, power to a motor (not shown), which is the power source of the vehicle 2. The battery 24 is configured by connecting a plurality of secondary batteries such as lithium-ion batteries in series or in parallel. The battery 24 is electrically connected to the power reception coil 21 via the relay switch of the power reception circuit 23. The battery 24 is connected to the charger 33.

The display 25 is, for example, provided to an instrument panel of the vehicle 2, and displays a map in a navigation system and a captured image or the like of a camera 27 in a parking assist system. The display 25 also displays the state of the power supply device 1 and the position of the power supply device 1 on the map. The display 25 also displays a guide screen for charging, when charging the battery 24 with the power supply device 1.

The wireless communication unit 26 is a communication transceiver for performing wireless communication with the wireless communication unit 16 on the power supply device 1 side. The camera 27 is an imaging device for capturing the surroundings of the vehicle. The camera 27 is provided in the vehicle 2 in a position capable of capturing the surroundings of the vehicle 2. There may be a plurality of cameras 27.

The GPS 28 (Global Positioning System) is a system for measuring the current position of the vehicle 2, using a receiver for receiving signals from a satellite. The memory 29 is a recording medium for recording identification information (ID) that is provided to each vehicle in advance, and information that is transmitted from the power supply device 1 side. The parking confirmation button 31 is a button for confirming that the driver has the intention to park, and is a switch for starting the parking assist system by an operation of the user. The parking confirmation button 31 is provided to the instrument panel.

The charging port 32 is a terminal for connecting a plug of a charging cable. When charging the battery 24 by a contact power supply, the charging cable that is connected to the power supply device 1 is connected to the charging port 32.

The charger 33 is a conversion circuit for converting the power that is outputted from the power supply device 1 via the charging port 32 and the charging cable to DC power, and comprises an inverter, a rectifier, and a smoothing circuit, etc. The controller 20 converts the AC power that is outputted from the power supply device 1 to a power that is suitable for charging the battery 24 by controlling the switching element included in the inverter, based on the charging state of the battery 24 (SOC: State of Charge), and supplies the same to the battery 24. The charging state of the battery 24 is calculated based on a value of the voltage or the current of the battery 24 detected by a detection sensor (not shown) connected to the battery 24.

The park lock mechanism 34 is a mechanical mechanism for fixing the rotation of the wheels, such as an emergency brake or a parking rod.

Figure 2:
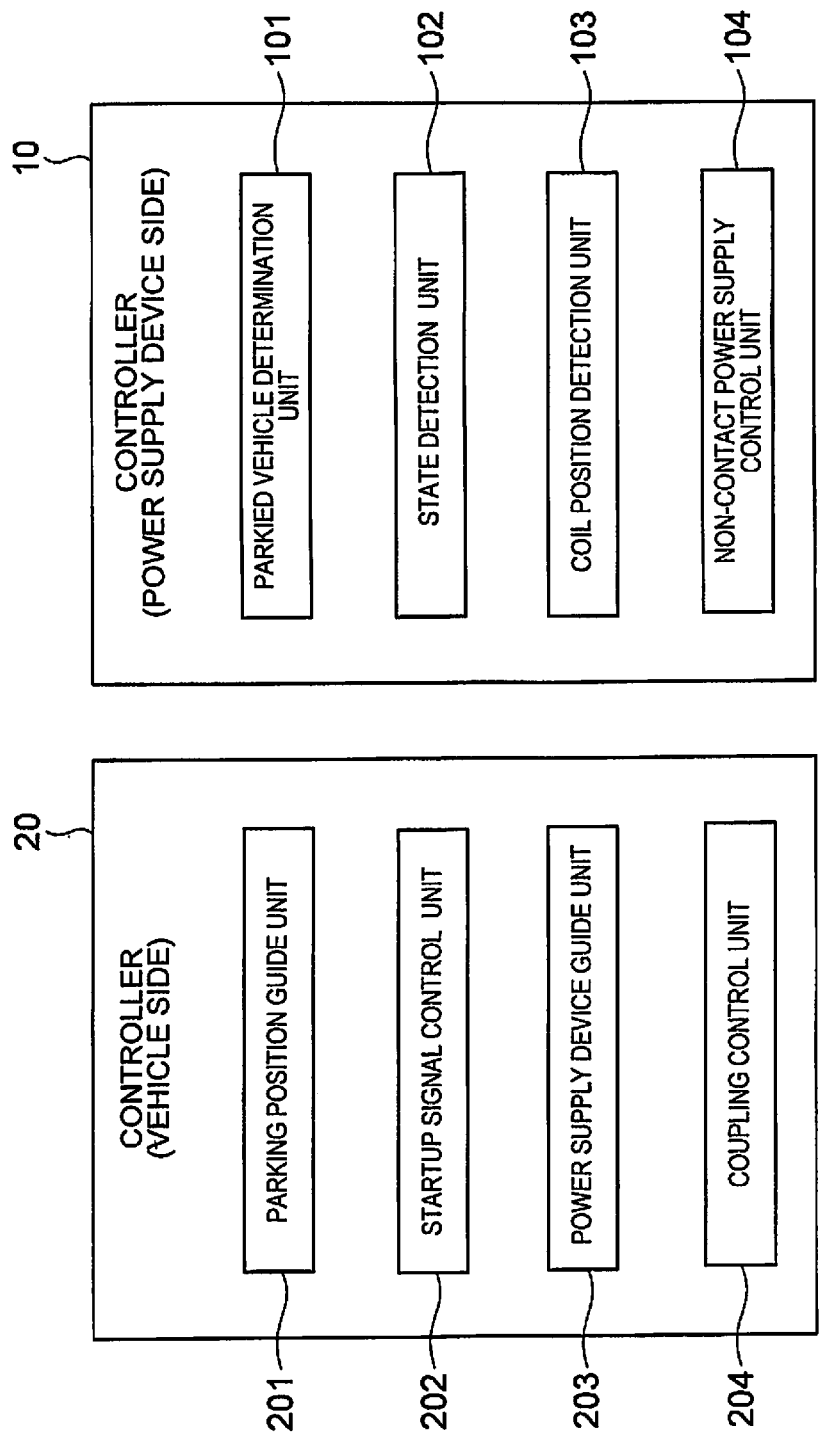
FIG. 2 is a control block diagram of the vehicle side controller and the power supply device side controller in FIG. 1.

The configuration of the power supply device 1 side controller 10 and the configuration of the vehicle 2 side controller 20 will be described next, using FIG. 1 and FIG. 2.

The controller 10 comprises a parked vehicle determination unit 101, a state detection unit 102, a coil position detection unit 103, and a non-contact power supply control unit 104.

The parked vehicle determination unit 101 is a control unit for determining whether or not a vehicle is stopped in a parking space of the power supply device 1, based on the detection value of the sensor 12. The controller 10 makes the control when the vehicle is stopped in a parking space and the control when the vehicle is not stopped in a parking space, different controls, as described below. Accordingly, the parked vehicle determination unit 101 determines whether or not a vehicle is parked in a parking space, in order to determine with which control flow the controller 10 controls the power supply device 1.

The state detection unit 102 detects the state of the power supply device 1, based on the detection value of the sensor 12 and the diagnostic results of the self-diagnosis circuit 14. The states of the power supply device 1 include: a non-contact power supply possible state in which non-contact power supply can be performed normally; a recoverable state in which, even if there is some kind of abnormality, the abnormality or the problem can be removed by the user of the vehicle 2; a contact power supply possible state in which only charging by contact power supply is possible; and a power supply disabled state representing a state in which charging cannot be performed by either non-contact power supply or contact power supply.

When there is no abnormality in the circuit, etc., inside of the power supply device 1 according to the self-diagnosis circuit 14, and there is no foreign object on the power transmission coil 11 according to the detection value of the sensor 12, the state detection unit 102 detects the state to be a state in which power can be supplied from the power transmission coil 11 to the power reception coil 21 in a non-contact manner; that is, to be the non-contact power supply possible state.

The state detection unit 102 determines whether or not there is a foreign object on the power transmission coil 11 by analyzing a captured image on the power transmission coil 11 obtained from the sensor 12. When there is a metallic foreign object on the power transmission coil 11, such as an empty can, there are cases in which the magnetic flux that is outputted from the power transmission coil 11 is affected by the foreign object during the non-contact power supply, and the coupling between the coils becomes poor. On the other hand, the foreign object on the power transmission coil 11 can be easily removed by the user of the vehicle. Accordingly, the state detection unit 102 detects a state, in which the user is able to recover from a state in which power cannot be supplied in a non-contact manner to a non-contact power supply possible state, i.e., a recoverable state, if the power supply device 1 is detected to be normal by the self-diagnosis circuit 14 and a foreign object is detected on the power transmission coil 11 by the sensor 12.

In addition, the state detection unit 102 also determines the state to be the recoverable state described above when the self-diagnosis circuit 14 detects that the cable of the power supply device 1 is detached from the AC power source 3. If the power supply device 1 is configured so that the user is able to connect the cable of the power supply device 1 to an AC power source 3, said cable detachment is also a problem that can be removed by the user. A cable detachment can be detected by the self-diagnosis circuit 14 by detecting an impedance change or a potential difference caused by the presence/absence of a cable connection. Accordingly, the state detection unit 102 detects a recoverable state based on the diagnostic results of the self-diagnosis circuit 14.

The recoverable state is not limited to a problem due to a foreign object on the power transmission coil 11 or due to a cable not being connected to the AC power source 3, and may be a state in which there are other flaws or problems that can be solved by the user. An example is when the system is temporarily shut down for maintenance of the non-contact power supply system and charging by the non-contact power supply cannot be performed immediately even when the user parks in a parking space, but charging can be performed after completion of the maintenance. In such a case, a user is able to solve the problem of not being able to perform non-contact charging by setting a timer in accordance with the completion time of the maintenance. Accordingly, the state detection unit 102 may also determine such a state to be a recoverable state.

Additionally, the state detection unit 102 also diagnoses abnormalities in the charging circuit according to the contact power supply with the self-diagnosis circuit 14. Accordingly, the state detection unit 102 detects the state to be a contact power supply possible state, when the non-contact power supply cannot be performed and when only charging by a contact power supply is possible. In addition, the state detection unit 102 detects the state to be a power supply disabled state when neither a non-contact power supply nor a contact power supply can be performed, and when not in a recoverable state.

The coil position detection unit 103 detects the relative position of the power reception coil 21 with respect to the power transmission coil 11 using the sensor 12.

The non-contact power supply control unit 104 outputs the power of the AC power source 3 to the power transmission coil 11 to control the charging of the battery 24, by controlling the power unit 13 based on a signal that is received by the wireless communication unit 16. Since the startup signal of the power supply device 1 can be transmitted from the vehicle 2 in the present embodiment, the non-contact power supply control unit 104 can start a non-contact power supply based on the startup signal that is received by the wireless communication unit 16. Additionally, the non-contact power supply control unit 104 obtains the required output of the vehicle 2 side via the wireless communication of the wireless communication units 16 and 26, and controls the power unit 13 so that the required output is outputted from the power transmission coil 11. The required power is set on the vehicle 2 side in accordance with the charging state of the battery 24.

The controller 20 on the vehicle 2 side comprises a parking position guide unit 201, a startup signal control unit 202, a power supply device guide unit 203, and a coupling control unit 204.

The parking position guide unit 201 is a control unit for controlling a parking assist system. When the parking confirmation button 31 is pressed by the user, the parking position guide unit 201 activates the parking assist system, displays the image of the surroundings of the vehicle 2 on the display 25 based on the captured image of the camera 27, and performs guidance on the display screen of the display 25 to guide the position of the vehicle 2 to a predetermined parking position. In particular, in a non-contact charging system, the coupling between coils becomes weak when the positional displacement between the coils is large. Accordingly, the present embodiment is configured so that the positioning of the power transmission coil 11 and the power reception coil 21 will be easy, with the parking position guide unit 201.

The parking position guide unit 201 is not limited to the periphery of a parking space comprising a power supply device 1, and notifies on the display 25 that there is a power supply device 1 comprising a non-contact power supply system, for example, 30 m away from the current position of the vehicle.

The startup signal control unit 202 transmits a startup signal for activating a power supply device 1 from a running vehicle with the wireless communication unit 26, based on the current position of the vehicle 2 that is measured by the GPS 28 system, or, an operation of the parking confirmation button 31. In addition, the startup signal control unit 202 transmits a startup signal for activating a power supply device 1 from a stopped vehicle with the wireless communication unit 26, based on a timer setting or the state of the power switch. Furthermore, the startup signal control unit 202 makes the startup signal that is transmitted from a running vehicle 2, and the startup signal that is transmitted from a stopped vehicle 2, separate startup signals. Accordingly, a controller 10 that receives a startup signal is able to differentiate whether the startup signal is a signal transmitted from a running vehicle 2 or a signal transmitted from a stopped vehicle 2.

The power supply device guide unit 203 informs the state of the power supply device 1, by displaying the detection results of the state detection unit 102, which is received from the wireless communication unit 26, on the display 25.

The coupling control unit 204 allocates a power pattern based on the identification information (ID) of the power supply device 1, which is transmitted from the power supply device 1, and transmits a power pattern list that is allocated to each power supply device 1 to the power supply device 1. Then, the coupling control unit 204 detects the pattern of the power received by the power reception coil 21 after being transmitted from the power supply device 1 based on the power pattern, and determines whether or not a paired communication has been established between the vehicle 2 and the power supply device 1, based on the detected power pattern.

As a feature of the communication of the wireless communication unit 16 and the wireless communication unit 26 using the wireless LAN method or the like, for example, when transmitting a signal with the wireless communication unit 26 on the vehicle 2 side, a plurality of wireless communication units 16 positioned within the communication range of the wireless communication unit 26 receive the signal. The wireless communication unit 26 of the vehicle 2 can also receive a signal from the wireless communication unit 16 of the power supply device 1, and can also receive a signal from a wireless communication unit 16 of another power supply device 1 other than this power supply device 1. Consequently, even if the vehicle 2 is parked in a parking space to which a power supply device 1 is provided, the power supply device 1 cannot grasp which vehicle has parked, and the vehicle 2 cannot grasp to which parking spot and at which power supply device 1 the vehicle has parked, by wireless communication alone. Consequently, communication cannot be established between the vehicle 2 and the power supply device 1 of the parking space to which the vehicle has parked.

On the other hand, separately providing close range communication units that are different from the wireless communication units 16 and 26, in order to make a one-to-one dedicated communication between the power supply device 1 and the vehicle 2, is not preferable, from the point of view of cost. Accordingly, in the present embodiment, communication between the power supply device 1 and the vehicle 2 is established by utilizing non-contact power supply between the power transmission coil 11 and the power reception coil 21. The coupling control unit 204 is a control unit for establishing such a paired communication between the vehicle 2 and the power supply device 1.

Herein below, a state in which the power supply device 1 side has grasped the identification information of the parked vehicle 2, and in which a one-to-one communication has been established between the power supply device 1 and the vehicle 2, in other words, a state in which the vehicle 2 side has grasped the identification information of the power supply device 1 at which the vehicle has parked, shall be referred to as a state in which coupling has been established. The control to establish this coupling corresponds to the coupling control.

The control of the controllers 10 and 20 is described next, using FIG. 1 and FIG. 2. The basic control, from transmitting a startup signal from the vehicle 2 to the power supply device 1, to controlling the charging by a non-contact power supply with the power supply device 1, will be described.

First, the controller 20 of the vehicle 2 determines whether or not the vehicle 2 is traveling or stopped based on, for example, the rotational speed of the motor (not shown) of the vehicle 2. Then, the startup signal control unit 202 generates a startup signal (traveling) when the state of the vehicle 2 is traveling, and generates a startup signal (stopped) when the state of the vehicle 2 is stopped. The startup signal (traveling) and the startup signal (stopped) comprise an identifier which indicates the state of the vehicle 2, traveling or stopped. Then, the startup signal control unit 202 transmits a startup signal (traveling or stopped) to the power supply device 1 with the wireless communication unit 26.

When receiving a startup signal that is transmitted from the vehicle 2, the power supply device 1 determines whether or not a vehicle is parked in the parking space with the parked vehicle determination unit 101.

When the parked vehicle determination unit 101 determines that a vehicle 2 is not parked in the parking space and a startup signal (traveling) is received, the controller 10 performs a control to diagnose the state of the power supply device 1 by the state detection unit 102. That is, when the power supply device 1 receives a startup signal from a traveling vehicle 2 in a state in which a vehicle 2 is not parked in the parking space, there is the possibility that the vehicle that transmitted the startup signal will park at this power supply device 1. At this time, if, for example, the power supply device 1 cannot perform charging by a non-contact power supply but is in a contact power supply possible state, notifying the state of the power supply device 1 before the vehicle 2 parks in the parking space is preferable. Accordingly, the state detection unit 102 performs a control to diagnose the state of the power supply device 1.

Additionally, when the parked vehicle determination unit 101 determines that a vehicle 2 is not parked in the parking space and a startup signal (traveling) is received, the controller 10 causes the non-contact power supply control unit 104 to output weak power to establish a coupling with the vehicle 2. The coupling control utilizes the non-contact power supply between coils; when the positional displacement of the power reception coil 21 with respect to the power transmission coil 11 is great, there is a possibility that sufficient power to allow detection cannot be received by the power reception coil 21, even if power for coupling is outputted from the power transmission coil 11.

Accordingly, the controller 10 detects the position of the power reception coil 21 with respect to the power transmission coil 11 while the vehicle 2 is parking or after the vehicle 2 has parked but before the coupling control, with the coil position detection unit 103. When the positional displacement between the coils is outside of the allowable range, the coil position detection unit 103 causes the wireless communication unit 16 to transmit a signal to instruct re-parking and display information instructing re-parking on the display unit 17. The allowable range represents the upper limit of the positional displacement of the coils with which coupling control can be performed.

When the positional displacement of the coils is within the allowable range according to the coil position detection unit 103, the controller 10 causes the wireless communication unit 16 to transmit a signal indicating the start of the coupling.

In addition, when receiving an advance notice signal for coupling from the power supply device 1 side, the controller 20 on the vehicle 2 side starts the control of the coupling with the coupling control unit 204. The coupling control will be described in detail below.

After the coupling has been established, the controllers 10 and 20 perform charging control of the battery 24 by the non-contact power supply. If a timer has been set, the charging of the battery 24 is started when the set time arrives. If a timer has not been set, and the charging is not canceled, charging of the battery 24 is started when the power switch (not shown) of the vehicle 2 is switched from an ON state to an OFF state, or, when switched from a Ready state to the OFF state.

Here, the ON state represents a transitioned state by an ON operation of the power switch. The controller 20 is activated when the power switch is in the ON state, but the relay switch of the power reception circuit 23 is OFF, and between the motor and the battery 24 as well as between the charger 33 and the battery are also cut off due to relay off (a switch different from the relay switch of the power reception circuit 23); as a result the vehicle 2 cannot be driven, and the battery 24 is not in a state that can be charged by an external power source.

The Ready state is a state in which the brake pedal is depressed, and represents a transitioned state by an ON operation of the power switch. In the Ready state, the controller 20 is activated, between the motor and the battery 24 becomes an electrically conductive state, the relay switch of the power reception circuit 23 is turned OFF, and between the charger 33 and the battery 24 is cut off. Consequently, the vehicle 2 can be driven, but the battery 24 is not in a state that can be charged by an external power source.

On the other hand, when reaching the set time for timer charging, or, when an instruction to start charging is inputted to the controller 20 by the user and the power switch is switched from the ON state to the OFF state, or from the Ready state to the OFF state, the controller 20 is activated, the relay switch of the power reception circuit 23 is turned ON, and between the charger 33 and the battery 24 there is an electrically conductive state. The vehicle 2 thereby enters a chargeable state electronically as well.

When controlling the charging of the battery 24, the controller 20 manages the charging state of the battery 24, and transmits the required power to the power supply device 1 side to adjust the charging power of the battery 24, in accordance with the SOC of the battery 24. The controller 10 of the power supply device 1 controls the power unit 13 with the non-contact power supply control unit 104, in accordance with the required power from the vehicle 2 side. Then, when the SOC of the battery 24 reaches a target SOC, the controller 20 transmits a stop signal for stopping the charging to the power supply device 1. The non-contact power supply control unit 104 stops the output of power based on the stop signal.

The control described above is an outline of the control of the controller 10 of the power supply device 1 and the controller 20 of the vehicle 2; however, the controller 10 on the power supply device 1 side omits a part of the control described above depending on whether or not a vehicle is stopped in a parking space, and whether or not the startup signal that is transmitted from the vehicle 2 was transmitted while traveling.

Figure 3:
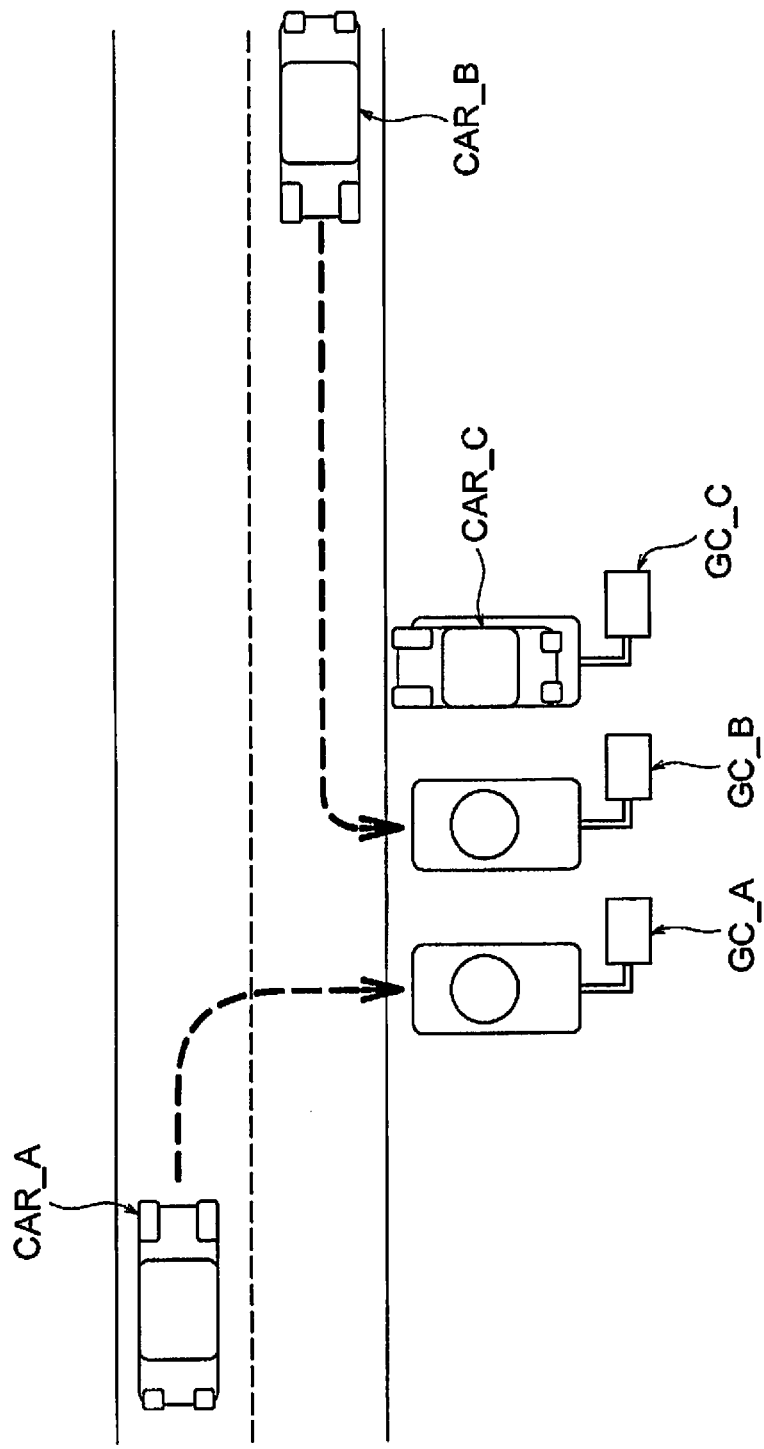
FIG. 3 is a plan for explaining the positional relationships of a plurality of vehicles, and a plurality of parking spaces each provided with a power supply device.

Thus, the specific control of the controllers 10 and 20 according to the state of the vehicle and whether or not a vehicle is stopped in the parking space will be described below, using FIG. 1-FIG. 3. FIG. 3 is a plan view for explaining the positional relationships of a plurality of vehicles 2 and a plurality of parking spaces, each provided with a power supply device 1. In FIG. 3, the vehicle (CAR_A) is trying to park at the nearest power supply device (GC_A) among a plurality of power supply devices 1 (GC_A, GC_B, GC_C). The vehicle (CAR_C) is already stopped in a parking space of power supply device (GC_C), but is not performing charging of the battery 24 by the contact power supply or non-contact power supply. Since a vehicle (CAR_C) is stopped at the nearest power supply device (GC_C), the vehicle (CAR_B) is trying to park at the next closest power supply device (GC_B). The CAR_A, B, C in the drawing represent the identification information (ID) of the vehicles 2, and GC_A, B, C represent the identification information of the power supply devices 1.

The control for when startup signals are transmitted from the running vehicles (CAR_A, CAR_B) will be described first.

The generation of a startup signal by the vehicle 2 will be described. The controller 20 determines whether or not the parking confirmation button 31 has been pressed during the traveling of the vehicle 2. Then, if the parking confirmation button 31 has been pressed, the startup signal control unit 202 transmits a startup signal (traveling) along with the identification information. Even when the parking confirmation button 31 has not been pressed, the controller 20 determines whether or not the distance between the current position of the vehicle and the position of a registered power supply device 1 is equal to or less than a predetermined determination threshold. Then, if the distance between the current position of the vehicle and the position of the power supply device 1 is less than or equal to the predetermined determination threshold, the startup signal control unit 202 turns the wireless communication unit 26 ON and transmits a startup signal (traveling) along with the identification information. A registered power supply device 1 is, for example, a power supply device 1 in a home parking space or in the vicinity of a travel route to a destination, and is recorded in the memory 29. The power supply device 1 may be registered by the user, or, when the battery 24 becomes lower than a predetermined value, a power supply device 1 in the vicinity of the current position of the vehicle or in the vicinity of a reachable point of the vehicle 2, can be identified by the controller 20 and registered in the memory 29.

On the other hand, if the parking confirmation button 31 is not pressed and the distance between the current position of the vehicle 2 and the position of a registered power supply device 1 is longer than the predetermined determination threshold while the vehicle is traveling, the startup signal control unit 202 turns the wireless communication unit 26 OFF and does not transmit a startup signal (traveling). Additionally, if the wireless communication unit 26 is ON and the distance between the current position of the vehicle 2 and the position of a registered power supply device 1 becomes longer than the predetermined determination threshold, the startup signal control unit 202 switches the wireless communication unit 26 from ON to OFF.

In the example in FIG. 3, the distances between the positions of the vehicles (CAR_A, CAR_B) and the positions of the registered power supply devices (GC_A, B, C) are equal to or less than the predetermined determination threshold, and the startup signal control unit 202 transmits the identification signals of the vehicle (CAR_A or CAR_B) and a start signal (traveling) to the power supply devices (GC_A, B, C). After transmitting the startup signal (traveling), the controller 20 of the vehicles (CAR_A, CAR_B) enters a state of waiting for a signal from the power supply device 1.

The control of the controller 10 on the power supply device 1 side, which has received a startup signal (traveling)), will be described next. When receiving a startup signal (traveling), the controller 10 activates the systems other than the reception system of the wireless communication. The parked vehicle determination unit 101 determines whether or not a vehicle 2 is stopped in the parking space. Since a vehicle is not stopped in the parking space, the power supply devices (GC_A, B) determine that there is no parked vehicle. On the other hand, since a vehicle (CAR_C) is stopped in the parking space, the power supply device (GC_C) determines that there is a parked vehicle.

If the parked vehicle determination unit 101 determines that there is no parked vehicle, the controller 20 crosschecks the identification information of the vehicle that is contained in the received startup signal and the vehicle identification information that is registered in the memory 15.

Regarding the identification information that is recorded in the memory 15, if, for example, the power supply device 1 is set in a home parking space, the identification information of the vehicle of the owner of the power supply device 1 is recorded in the memory 15. Alternatively, if the non-contact power supply system of the present embodiment is a member-only system, the identification information of subscribed vehicles, or the identification information that indicates one to be a member, is recorded in the memory 15. When using identification information that is common for members, the identification information is recorded in the memory 29 of the vehicle 2 side as well, and is transmitted to the power supply device 1 from the vehicle 2 along with the start signal.

When the identification information that is received along with the startup signal (traveling) and the identification information in the memory 15 match, the controller 10 determines that the identification information is permitted. On the other hand, when the received identification information and the identification information in the memory 15 do not match, the controller 10 determines that the identification information is not permitted. If the identification information is not permitted, the controller 10 does not perform the coupling control and the self-diagnosis control by the state detection unit 102, and enters a sleep state.

If the identification information is not permitted, non-contact charging is not performed even if the vehicle having the unpermitted identification information parks in the parking space; therefore, performing self-diagnosis control, etc., is not necessary. In addition, if the self-diagnosis results of the power supply device 1 are notified to the vehicle with the unpermitted identification information, there is a possibility that the user of the vehicle will see the notification results and erroneously park the vehicle 2 in the parking space, even though non-contact charging is not permitted. Therefore, if the identification information is not permitted, the controller 10 omits the self-diagnosis control, etc., and enters a sleep state. The present embodiment can thereby suppress the power consumption of the power supply device 1.

Next, if the identification information is permitted, the controller 10 detects the state of the power supply device 1 with the state detection unit 102. In the example in FIG. 3, self-diagnosis control is performed by the power supply devices (GC_A, B) receiving the start signal of the vehicle (CAR_A).

If the state detection unit 102 detects a non-contact power supply possible state of the power supply device 1, the controller 10 lights the lamp display of the display unit 17 "blue". If the state detection unit 102 detects a recoverable state of the power supply device 1, the controller 10 blinks the lamp display of the display unit 17 "blue". If the state detection unit 102 detects a contact power supply possible state of the power supply device 1, the controller 10 blinks the lamp display of the display unit 17 "red". Furthermore, if the state detection unit 102 detects a power supply disabled state of the power supply device 1, the controller 10 lights the lamp display of the display unit 17 "red". That is, in the present embodiment, the display state of the display unit 17 is differentiated depending on the detection result of the state detection unit 102.

When wireless communication with the vehicle 2 is being continued, the controller 10 continues the lamp display by the display unit 17 as described above. On the other hand, when a predetermined time has elapsed since the wireless communication with the vehicle 2 was interrupted; the controller 10 controls the display unit 17 to turn off the lamp display. A case in which the wireless communication is interrupted is, for example shown in the example in FIG. 3, a case in which a vehicle (CAR_A) approaches a power supply device (GC_A) but passes without stopping in the parking space of the power supply device (GC_A). In such a case, displaying the state of the power supply device 1 on the display unit 17 even though the vehicle 2 is not present in the vicinity of the power supply device 1 becomes unnecessary. Accordingly, the controller 10 turns off the lamp display.

In addition, in the present embodiment, the state of the power supply device 1 is not notified by a lamp display of the display unit 17 of the power supply device 1, with respect to a vehicle 2 with an unpermitted identification signal. Referring to FIG. 3, for example, it shall be assumed that a power supply device (GC_B) is owned by the user of a vehicle (CAR_D), and only CAR_D is registered to the memory 15 of the power supply device (GC_B) as the vehicle identification information. In this case, if the state of the power supply device 1 is notified by a lamp display without performing identity authentication, the display unit 17 would be lit, even if vehicles (CAR_A, B) other than the vehicle (CAR_D) are traveling in the vicinity of the power supply device (GC_B). Accordingly, in the present embodiment, the controller 10 performs a control so that the state of the power supply device 1 is not displayed by the display unit 17 with respect to a vehicle 2 with an unpermitted identification signal.

Additionally, if the detection result of the state detection unit 102 is a non-contact power supply possible state, if the detection result is a recoverable state, or if in a contact power supply possible state, the controller 10 transmits the detection result to the vehicle 2 by wireless communication. After transmitting the detection results, the controller 10 enters a state of waiting for a signal from the vehicle 2.

On the other hand, if the detection result of the state detection unit 102 is a power supply disabled state, the controller 10 does not transmit the detection result by wireless communication. In the case that charging cannot be performed by the power supply device 1 and the problem causing the disabled charging cannot be solved by the user of the vehicle 2, the detection result would not be meaningful information for the user of the vehicle 2 even if the detection result is notified to the vehicle 2 side. Accordingly, in the present embodiment, if the detection result is a power supply disabled state, the detection result is not transmitted by wireless communication.

The users of the vehicles (CAR_A, B) can thereby confirm the state of the power supply devices (GC_A, B) from the differences in the display of the display unit 17 before parking at the power supply devices (GC_A, B). For example, if the power supply device (GC_A) is in a power supply disabled state and the power supply device (GC_B) is in a recoverable state, the users of the running vehicles (CAR_A, B) can recognize that the power supply device (GC_A) cannot perform charging, by checking the "red" lit state of the power supply device (GC_A). Additionally, the users of the running vehicles (CAR_A, B) can recognize that non-contact power supply is possible after the users solve some kind of abnormality, by checking the "blue" lit state of the power supply device (GC_B).

On the other hand, if the parked vehicle determination unit 101 determines that there is a parked vehicle, the controller 10 enters a sleep state without performing the authentication control of the identification information or the self-diagnosis control of the power supply device 1 described above. This control corresponds to the control of the power supply device (GC_C) in the example of FIG. 3.

Even if the power supply device (GC_C) receives a startup signal (traveling) from the vehicles (CAR_A, B), a vehicle (CAR_C) is already stopped. Accordingly, the vehicles (CAR_A, B) cannot be charged at the power supply device (GC_C); therefore, the power supply device (GC_C) does not need to authenticate the identification information of the vehicles (CAR_A, B), and notifying the state of the power supply device (GC_C) to the vehicles (CAR_A, B) is also not necessary. Accordingly, the power supply device (GC_C) immediately enters a sleep state when receiving a startup signal (traveling) from the vehicles (CAR_A, B). The present embodiment can thereby suppress the power consumption of the power supply device 1.

The control of the vehicle side, which has received information on the detection results of the state detection unit 102, will be described next. As described above, the vehicles (CAR_A, B) are in a state waiting for a signal from the power supply device 1 after transmitting the startup signal (traveling), and informs the state of the power supply device 1 by receiving a signal that contains the results of the self-diagnosis from the power supply device 1.

If a signal containing the detection result of a non-contact power supply possible state is received, the power supply device guide unit 203 displays the detection results and the position of the normal power supply device 1 corresponding to the detection results, on a map on the display 25. The power supply device guide unit 203 may indicate that a power supply device 1 is normal and capable of non-contact power supply by color identification, or, display on the display 25 that the power supply device 1 is normal by means of a pop-up function.

Additionally, if a signal containing the detection result of a recoverable state is received, the power supply device guide unit 203 displays the detection results and the position of the power supply device 1 corresponding to the detection results, on a map on the display 25. The power supply device guide unit 203 displays on the display 25 power supply devices that include abnormalities that can be solved by the user. When displaying a power supply device 1 that is in a recoverable state on the display 25, the display may be done with, for example, a different color from the display color of a normal power supply device 1, or displayed by means of a pop-up function. At this time, the abnormality causing the recoverable state may also be displayed.

In addition, if a signal containing the detection result of a contact power supply possible state is received, the power supply device guide unit 203 displays the power supply device that can only perform the contact power supply on the display 25. When displaying a power supply device 1 that is in a contact power supply possible state on the display 25, the display may be done with, for example, a different color from the display color of a normal power supply device 1 and the display color of a power supply device 1 in a recoverable state, or displayed by means of a pop-up function.

When a plurality of power supply devices 1 are contained in the map that is displayed by the display 25, the position of each power supply device 1 and the respective state that corresponds to each power supply device 1 are displayed on the display.

When the detection result of the state detection unit 102 is a power supply disabled state, the detection result is not transmitted by wireless communication; therefore, the power supply device guide unit 203 does not display the information of the power supply device 1 in the power supply disabled state on the display 25. That is, the power supply device guide unit 203 displays, on the display 25, a power supply device 1 that is capable of performing either non-contact charging or contact charging, and a power supply device 1 that is in a state that can be recovered to a chargeable state by the user of the vehicle 2. Accordingly, the user of the vehicle 2 can easily confirm that the state of the power supply device 1 is a chargeable state, by the display of the display 25.

Then, the users of vehicles (CAR_A, B) will park the vehicles in a parking space of the power supply devices (GC_A, B), while checking the display of the display unit 17 of the power supply device 1, or, the display of the display 25 of the vehicle 2.

When the vehicle approaches the parking space of the power supply device 1 (parking spaces of power supply devices (GC_A, B)) that transmitted a signal indicating the detection results of the state of the power supply device 1, the controller 20 transmits a parking signal to the power supply device 1 indicating the intention to park. The determination of whether or not the vehicle 2 has approached the power supply device 1 may be determined by, for example, comparing the position of the power supply device 1 and the current position of the vehicle, or, determined by measuring the reception strength of the wireless signal that is transmitted from the power supply device 1.

The coupling control of the power supply devices (GC_A, B) and the vehicles (CAR_A, B), with respect to a vehicle that is traveling in a parking space or a stopped vehicle that has parked, will be described next. First, the controller 10 receives the parking signal described above.

At this time, if the state of the power supply device 1 is a non-contact power supply possible state, the positional displacement between the coils is detected by the coil position detection unit 103. On the other hand, if the state of the power supply device 1 is a recoverable state, the controller 10 detects the positional displacement between the coils with the coil position detection unit 103, after confirming that the abnormality that is causing the recoverable state has been removed. Additionally, if the state of the power supply device 1 is a contact power supply possible state, the controller 10 performs a charging control by contact charging, without performing the coupling control or the detection control of the coil positions with the coil position detection unit 103.

Then, if the position of the power reception coil 21 of the vehicle 2 is detected by the coil position detection unit 103 based on the detection value of the sensor 12 and the positional displacement between the power transmission coil 11 and the power reception coil 21 is within an allowable range, the controller 10 transmits an excitation advance notice signal to the vehicle 2, indicating that preparation has been made for accepting coupling.

Here, in the example of FIG. 3, the vehicle (CAR_A) is assumed to have transmitted a parking signal before the vehicle (CAR_B). In addition, the power supply devices (GC_A, B, C) are assumed to have received the parking signal from the vehicle (CAR_A) before the parking signal from the vehicle (CAR_B).

In this case, the controller 10 of the power supply device (GC_A) transmits an excitation advance notice signal to the vehicles (CAR_A, B) by receiving the parking signal from the vehicle (CAR_A). The controller 10 of the power supply device (GC_B) transmits an excitation advance notice signal to the vehicles (CAR_A, B) by receiving the parking signal from the vehicle (CAR_A). At this time, the power supply device (GC_A) is in a position that is closer to the vehicle (CAR_A), which transmitted the parking signal first, than the power supply device (GC_B). Accordingly, the excitation advance notice signal of the power supply device (GC_A) is transmitted before the excitation advance notice signal of the power supply device (GC_B).

Then, the vehicle (CAR_A) receives the excitation advance notice signal of the power supply device (GC_B) after receiving the excitation advance notice signal of the power supply device (GC_A). In the same way, the vehicle (CAR_B) receives the excitation advance notice signal of the power supply device (GC_B) after receiving the excitation advance notice signal of the power supply device (GC_A). That is, the reception order of the excitation advance notice signals received by the vehicle (CAR_A) will be the same as the reception order of the excitation advance notice signals received by the vehicle (CAR_B).

The controller 10 may adjust the transmission timing between the power supply devices in order to make the reception order of the excitation advance notice signals the same among a plurality of vehicles that are present within the communication range. For example, if a parking signal containing the identification signal of the same vehicle is received by a plurality of power supply devices, the reception strength of the wireless signal will be higher for a power supply device that is closer to the vehicle. Accordingly, the controller 10 may adjust the transmission timing to be delayed more, the lower the reception strength. Additionally, for example, if information on the transmission time is included in the parking signal, the controller 10 can grasp the distance between the target vehicle and the power supply device from the time between the transmission time and the reception time. Then, the transmission timing can be made earlier as the distance to the power supply device 1 is shorter, and the transmission timing may be made later as the distance to the power supply device is longer.

A plurality of power patterns are recorded in advance in the memory 29 of the controller 10 of the vehicles (CAR_A, B). The number of power patterns is set according to, for example, the communication range of the wireless communication of the power supply device 1, and the number of power supply devices 1 that are present within the communication range.

The power patterns are described here. A power pattern represents the pattern of the power that is transmitted from the power transmission coil 11 to the power reception coil 21. A power pattern is an intensity distribution configured so that the intensity of power sent from the power transmission coil 11 is intermittently pulsed with respect to time. The power pattern is distinguished by changing the frequency, the intensity, or the duty, in the strength characteristics of the pulses with respect to time. The frequency, the intensity, and the duty may, for example, combine a plurality of elements, such as combining the frequency and the duty ratio.

The coupling control unit 204 generates a power pattern list by allocating the identification information that is included in the excitation advance notice signal to a plurality of power patterns in accordance with a rule that is set in advance. A rule that is set in advance is, for example, a case in which the identification information of the power supply device is allocated with respect to the sequence of a plurality of power patterns in the reception order of the excitation advance notice signal, or, a case in which the identification information of the power supply device is allocated in the registration order of the power supply device, which is included in the identification information. The identification information of the power supply device 1 is included in the excitation advance notice signal. In the present embodiment, a case in which the reception order of the excitation advance notice signal is configured as the rule that is set in advance will be described below.

FIG. 4 illustrates a schematic view of a power pattern list that is generated in the coupling control unit 204. Four power patterns I-IV are recorded in the memory 29. Then, the coupling control unit 204 allocates power patterns in order from I, in the reception order of the excitation advance notice signal, according to the rule that is set in advance. That is, in the example of FIG. 3, since the reception order of the excitation advance notice signal of the power supply device (GC_A) is first and the reception order of the excitation advance notice signal of the power supply device (GC_B) is second, the identification information (GC_A) is allocated to power pattern I, and the identification information (GC_B) is allocated to power pattern II. The power patterns are distinguished by the frequency.

Then, since the reception order of the excitation advance notice signal is the same for both the vehicle (CAR_A) and the vehicle (CAR_B), each coupling control unit 204 of the vehicles (CAR_A, B) generates the same power pattern list and records the same in the memory 29. Then, the coupling control unit 204 transmits the generated power pattern list to the power supply devices (GC_A, B) wirelessly.

The power supply devices (GC_A, B) that receive a signal including a power pattern list, cross-checks their own identification information registered in the memory 15 and the identification information contained in the power pattern list, and extracts the power pattern that corresponds to the matched identification information. In addition, the power patterns I-IV are also registered in the memory 29, and the power patterns are unified between the power supply device 1 and the vehicle 2.

The controller 10 determines whether or not the extracted power pattern matches the power pattern that is registered in the memory 15, by comparing the extracted power pattern and the power pattern that is recorded in the memory 15. Then, if the extracted power pattern is confirmed to be the unified power pattern, with the extracted power pattern matching the power pattern of the memory 15, the non-contact power supply control unit controls the power unit 13 according to the extracted power pattern, and causes the power transmission coil 11 to output a power that corresponds to the extracted power pattern.

Since the identification information (GC_A) in the examples of FIG. 3 and FIG. 4 is allocated to power pattern I, power is outputted from the power transmission coil 11 of the power supply device (GC_A) with the frequency of power pattern I. Since the identification information (GC_B) is allocated to power pattern II, power is outputted from the power transmission coil 11 of the power supply device (GC_B) with the frequency of power pattern II.

On the other hand, if the extracted power pattern is confirmed to be not the unified power pattern, with the extracted power pattern not matching the power pattern of the memory 15, the controller 10 transmits a signal indicating a pattern mismatch to the vehicle side.

After transmitting the power pattern list, the vehicle side controller 20 enters a state in which power can be detected using the sensor 22. When a power corresponding to the power pattern is transmitted from the power transmission coil 11, the power reception coil 21 receives a power corresponding to the pattern, and the sensor 22 detects the power. The coupling control unit 204 measures the power pattern by measuring the frequency of the detected power, based on the detection value of the sensor. Then, the coupling control unit 204 determines whether or not the measured power pattern matches the power pattern to which identification information is allocated according to the power pattern list.

If the power patterns (frequency) match, the coupling control unit 204 determines that a coupling has been established with the power supply device having identification information with a matching power pattern.

On the other hand, if the power patterns do not match, the coupling control unit 204 transmits to the power supply device 1 again a signal for performing coupling. If coupling is to be performed again, the power supply device side controller 10 receives the signal for performing coupling again, transmits an excitation advance notice signal, and transmits power according to the power pattern that is transmitted from the vehicle side again, in the same way as described above. Additionally, the vehicle side controller 10 receives the excitation advance notice signal, generates a power pattern list in the same way as described above, transmits the same to the power supply device side, and then measures the power pattern with the sensor 22.

In the example of FIG. 3, it is assumed that after the vehicles (CAR_A, B) generate the power pattern list of FIG. 4 and transmit the same to the power supply device side, the vehicle (CAR_A) stops at the power supply device (GC_A) and performs a power pattern measurement for coupling with the power supply device (GC_A), while the vehicle (CAR_B) stops at the power supply device (GC_B) and performs a power pattern measurement for coupling with the power supply device (GC_B).

In this case, the coupling control unit 204 of the vehicle (CAR_A) determines that the vehicle (CAR_A) is stopped at the power supply device (GC_A), by measuring the power pattern corresponding to the power pattern I, and with the measured power pattern matching the power pattern I of the power pattern list, and determines that a coupling has been established between the vehicle (CAR_A) and the power supply device (GC_A).

In addition, the coupling control unit 204 of the vehicle (CAR_B) determines that the vehicle (CAR_B) is stopped at the power supply device (GC_B), by measuring the power pattern corresponding to the power pattern II, and with the measured power pattern matching the power pattern II, and determines that a coupling has been established between the vehicle (CAR_B) and the power supply device (GC_B).

As another example, it is assumed that after the vehicles (CAR_A, B) generate the power pattern list of FIG. 4 and transmit the same to the power supply device side, the vehicle (CAR_A) stops at the power supply device (GC_B) and performs a power pattern measurement for coupling with the power supply device (GC_B), while the vehicle (CAR_B) stops at the power supply device (GC_A) and performs a power pattern measurement for coupling with the power supply device (GC_A).

In this case, the coupling control unit 204 of the vehicle (CAR_A) determines that the vehicle (CAR_A) is stopped at the power supply device (GC_B), by measuring the power pattern corresponding to the power pattern II, and with the measured power pattern matching the power pattern II of the power pattern list, and determines that a coupling has been established between the vehicle (CAR_A) and the power supply device (GC_B). Regarding the vehicle (CAR_B), a coupling is determined to have been established between the vehicle (CAR_B) and the power supply device (GC_A), by performing a coupling control based on the power pattern I, in the same way.

Additionally, it is assumed that the power pattern of FIG. 4 that is generated in the vehicle (CAR_A) has been sent to the power supply devices (GC_A, B), but a power pattern list that is different from the power pattern list of FIG. 4 is generated in the vehicle (CAR_B). In this case, a coupling can be established regardless of whether the vehicle (CAR_A) is stopped at the power supply device (GC_A) or at the power supply device (GC_B). On the other hand, the vehicle (CAR_B) cannot establish a coupling when stopping at either power supply device (GC_A, B). However, by performing a coupling again, the vehicle (CAR_B) can establish a coupling by generating a power pattern list again with respect to the power supply devices (GC_A, B) and measuring the power based on the power pattern of the generated power pattern list again.

When a coupling is established, the coupling control unit 204 registers in the memory 29 the identification information of the power supply device 1 on the partner side as an identification information that has been coupled. In addition, the coupling control unit 204 wirelessly transmits the coupling information (identification information in which a coupling has been established) by a signal indicating an established coupling, by corresponding the identification information of the power supply device of the coupling partner with the identification information of itself.

The controller 10 on the power supply device side receives the signal indicating an established coupling, and compares the identification information included in the signal and the identification information of itself. Then, if the identification signals match, the controller 10 determines that a coupling has been established with the vehicle corresponding to the matched identification information. In addition, the controller 10 registers in the memory 15 the identification information of the vehicle 2 on the partner side as an identification information that has been coupled. Then, after the coupling has been established, since the controllers 10 and 20 know the destination of the transmission, the controllers 10 and 20 are able to establish a one-to-one communication by wireless communication, by sending and receiving signals with the wireless communication units 16 and 26, after including the identification information of itself and the identification information of the partner.

In addition, the controller 10 wirelessly transmits the coupling information (identification information in which a coupling has been established) by a signal indicating an established coupling. After the coupling has been established, the other power supply device 1 and the other vehicle 2 do not require the information of the vehicle 2 and the power supply device 1 between which a coupling has been established. Accordingly, the other power supply device 1 and the other vehicle 2 can increase the accuracy of coupling by removing from the target of coupling, based on the identification information that is included in the coupling established signal.

As described above, in the present embodiment, the coil position is detected while performing a coupling control based on a signal that is transmitted by wireless communication. Accordingly, even when a vehicle is not stopped in a parking space, the power supply device 1 that has received these signals enters a state of waiting for the detection of the coil position. Furthermore, when omitting a control by the coil position detection unit from the control on the controller 10 side, the controller 10 will control the power unit 13 to output a power from the power transmission coil 11, based on the power pattern.

In the present embodiment, in order to shorten as much as possible the unnecessary control time described above, which is generated by performing wireless communication, the controller 10 of the power supply device 1, which does not have a vehicle parked in the parking space, enters a state of waiting for the detection of the coil position, or ends the power control based on the power pattern and transitions to a sleep state, if the identification information that is included in the signal that is received by wireless communication and that is registered in advance (permitted), and the identification information of its own power supply device do not match. The power consumption of the power supply device 1 can thereby be suppressed.

After the coupling has been established, the vehicle side controller 20 displays on the display 25 that charging by a non-contact power supply is possible. Then, if the power switch is turned OFF without an operation by the user to cancel the charge start, the controller 20 activates the park lock mechanism 34 and fixes the wheels so that the wheels will not rotate.

In a non-contact power supply, the coupling coefficient changes when the distance between the coils is changed. If the wheels are rotated and the distance between the coils changes while charging the battery 24, the coupling coefficient will be changed. At this time, if the coupling coefficient changes in a direction of improving, the charging current of the battery 24 becomes higher than the set current, and the load on the battery 24 becomes high. Accordingly, in the present embodiment, a park lock mechanism 34 is activated before the charging control.

The vehicle side controller 20 detects the charging state of the battery 24 that is starting to charge with a sensor and calculates the required power to the battery 24 from the SOC of the battery 24 and the target SOC. Then, the controller 20 transmits a request signal for charge start along with the calculated required power to the controller 10 on the power supply device side.

The non-contact power supply control unit 104 of the controller 10 controls the power unit 13 to output from the power transmission coil 11 the power corresponding to the required power from the vehicle 2, when receiving a request signal for charge start from the vehicle.

The vehicle side controller 20 manages the state of the battery and charges the battery 24 with the power of the power reception coil 21. Then, when the SOC of the battery 24 reaches the target SOC, the vehicle side controller 20 transmits a signal for ending the charging to the controller 10, and ends the charging control. The power supply device side controller 10 ends the charging control by receiving a charge end signal.

In addition, when a timer for charging is set after displaying on the display 25 that charging by the contact power supply is possible, the vehicle 2 side controller 20 transmits to the controller 10 a signal indicating that the timer has been set.

When receiving a signal indicating that the timer has been set, the controller 10 starts a trial charge of the battery 24 by controlling the power unit 13 to transmit power from the power transmission coil 11 to the power reception coil 21 for a short time.

The vehicle side controller 20 detects the power of the power reception coil 21 using the sensor 22. The controller 20 compares the detected power and a power threshold. The power threshold is the lower limit of the power that is required for charging the battery 24. Then, if the detected power is greater than the power threshold, the controller 20 sets the timer mode and enters a standby state. The timer mode is a charging mode in which the charging is started at a set time.

On the other hand, when the detected power is equal to or less than the power threshold, the controller 10 displays on the display 25 that there is a power shortage. When there is a power shortage, the parking position of the vehicle should be changed to reduce the positional displacement between the coils.

Usually, if a timer is set, the user of the vehicle is not in the vicinity of the vehicle when the charging is started. Consequently, even if the positional displacement of the coils is large and there is a power shortage, parking the vehicle again, or adjusting the position of the coil by using a coil position adjustment mechanism, are not possible. Accordingly, in the present embodiment, a trial charge is performed when a timer has been set.

The trial charge is not necessarily required to actually charge the battery 24; being able to confirm that the power required for charging the battery 24 has been received by the power reception coil 21 is sufficient.

The above is the control for when startup signals are transmitted from the running vehicles (CAR_A, CAR_B). The control for when a startup signal is transmitted from the stopped vehicle (CAR_C) will be described next.

The generation of a startup signal by the vehicle 2 will be described. When a timer mode for charging is set, the startup signal control unit 202 transmits a startup signal (stopped) at the set time.

Additionally, if the vehicle (CAR_C) is parked in the parking space of the power supply device (GC_C) but the control sequence described above is canceled, the controller 20 keeps the cancel history in the memory 29. If the user operates the power switch and turns the power switch to the ON state or to the Ready state, in a state in which a timer mode for charging has not been set, the controller 20 displays a setting screen for starting the charging by non-contact power supply on the display 25. Then, if the power switch is turned OFF after the user performs a charge start operation, the startup signal control unit 202 transmits a startup signal (stopped).

When receiving a startup signal (stopped), the power supply device side controller 10 activates the systems other than the reception system of the wireless communication. The parked vehicle determination unit 101 determines the presence/absence of a parked vehicle. When a parked vehicle is present, the controller 10 performs a cross-check of the identification information with the vehicle 2.

If the identification information is permitted, the controller 10 detects the state of the power supply device (GC_C) with the state detection unit 102. The control of the state detection unit 102 is the same as described above.

When the state detection unit 102 detects a non-contact power supply possible state of the power supply device 1, the controller 10 transmits a signal to the vehicle side, indicating that accepting of charging by a non-contact power supply is possible (hereinafter referred to as the acceptable signal).

On the other hand, when the state detection unit 102 detects a recoverable state, a contact power supply possible state, or a power supply disabled state, the controller 10 does not transmit an acceptable signal, and enters a sleep state. The controller 10 may wirelessly transmit a signal representing the detection results, to compensate for not transmitting an acceptable signal.

Then, the vehicle side controller 20 performs a coupling control and starts the charging after receiving the acceptable signal, in the same way as above. The power supply device side controller 10 also performs a coupling control and starts the charging after transmitting the acceptable signal, in the same way as above. If a coupling control is already being performed at the time of stopping the vehicle, the controllers 10 and 20 may omit the coupling control based on the sending and receiving of the acceptable signal.

When the parked vehicle determination unit 101 determines that there is no parked vehicle after receiving a startup signal (stopped), the power supply device side controller 10 enters a sleep state without performing a cross-check of the identification information, the self-diagnosis control, or the coupling control.

The present embodiment can thereby activate the power supply device 1 even from a stopped vehicle without being limited to a running vehicle, by separating the startup signal from the vehicle 2 depending on whether the vehicle is traveling or the vehicle is stopped. Since the startup signals are distinguished, the power supply device 1 is able to separate a control with respect to a running vehicle and a control with respect to a stopped vehicle. That is, when a startup signal (stopped) is received in a state in which a vehicle is not stopped in the parking space, the possibility for a running vehicle to stop in the parking space is slight. Accordingly, by omitting the cross-check of the identification information, the self-diagnosis control, and the coupling control, etc., from the control sequence of the power supply device 1, the control flow can be shortened while suppressing power consumption.

Additionally, since the startup signal is transmitted from the vehicle side even when a timer mode for charging is set in the present embodiment, charging can be started automatically.

In addition, for example as a first scene, when the charging by non-contact charging is canceled after stopping in the parking space of the power supply device 1 and the charging is to be started again, charging can be started by switching the power switch from the OFF state to the ON state and then to the OFF state again, or, by switching the power switch from the OFF state to the Ready state and then to the OFF state again. As a second scene, when the charging by non-contact charging is not canceled after stopping in the parking space of the power supply device 1 and a timer mode for charging has not been set, charging can be started when the power switch is switched from the ON state to the OFF state, or, when the power switch is switched from the Ready state to the OFF state.

The behavior of the power switch as a trigger for charging will thereby become the same in either scene; as a result, a non-contact power supply system that is easy for the user to understand can be achieved.

Figure 5:
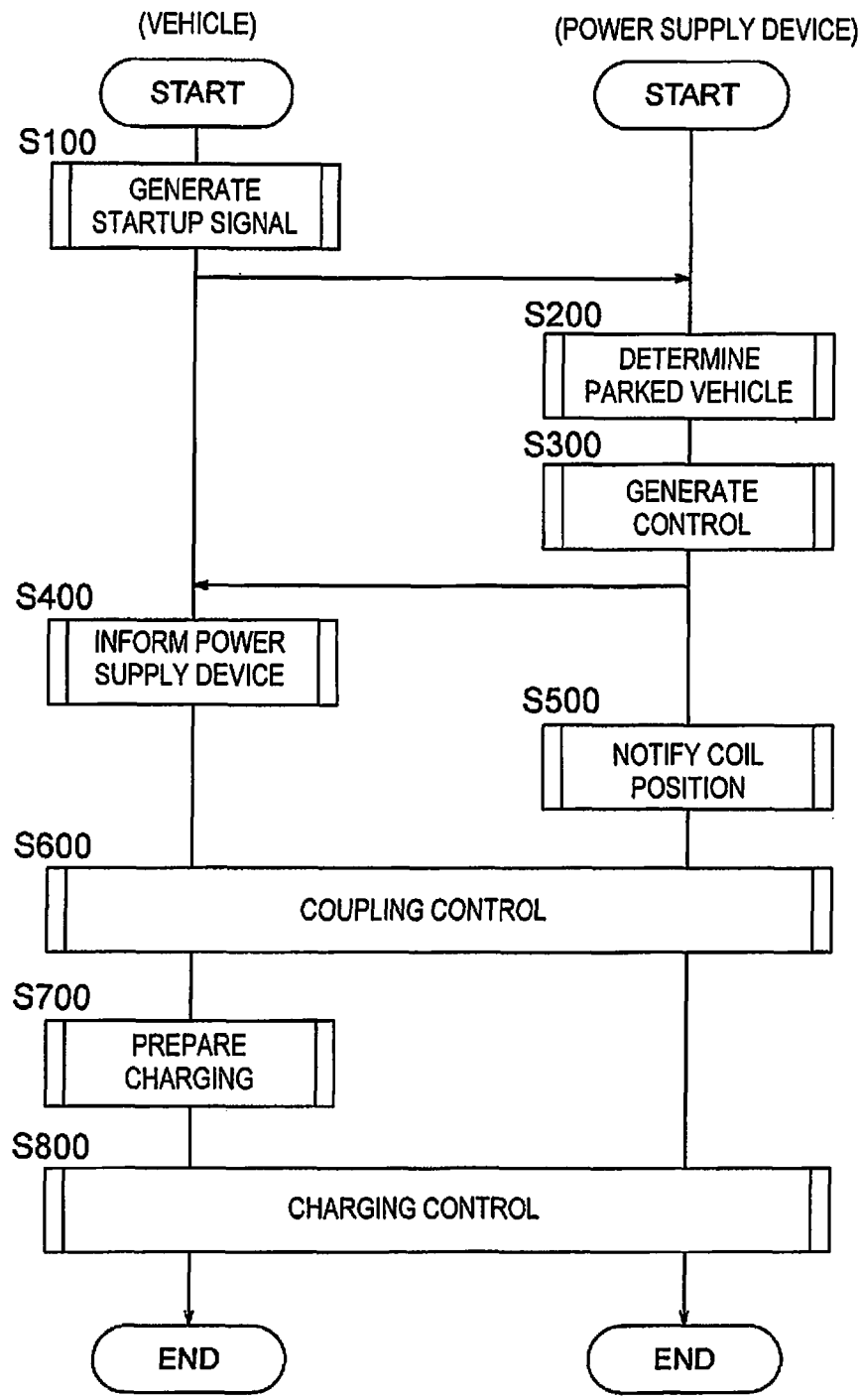
FIG. 5 is a flow chart illustrating the control flow of the vehicle side controller and the power supply device side controller in FIG. 1.
Figure 6:
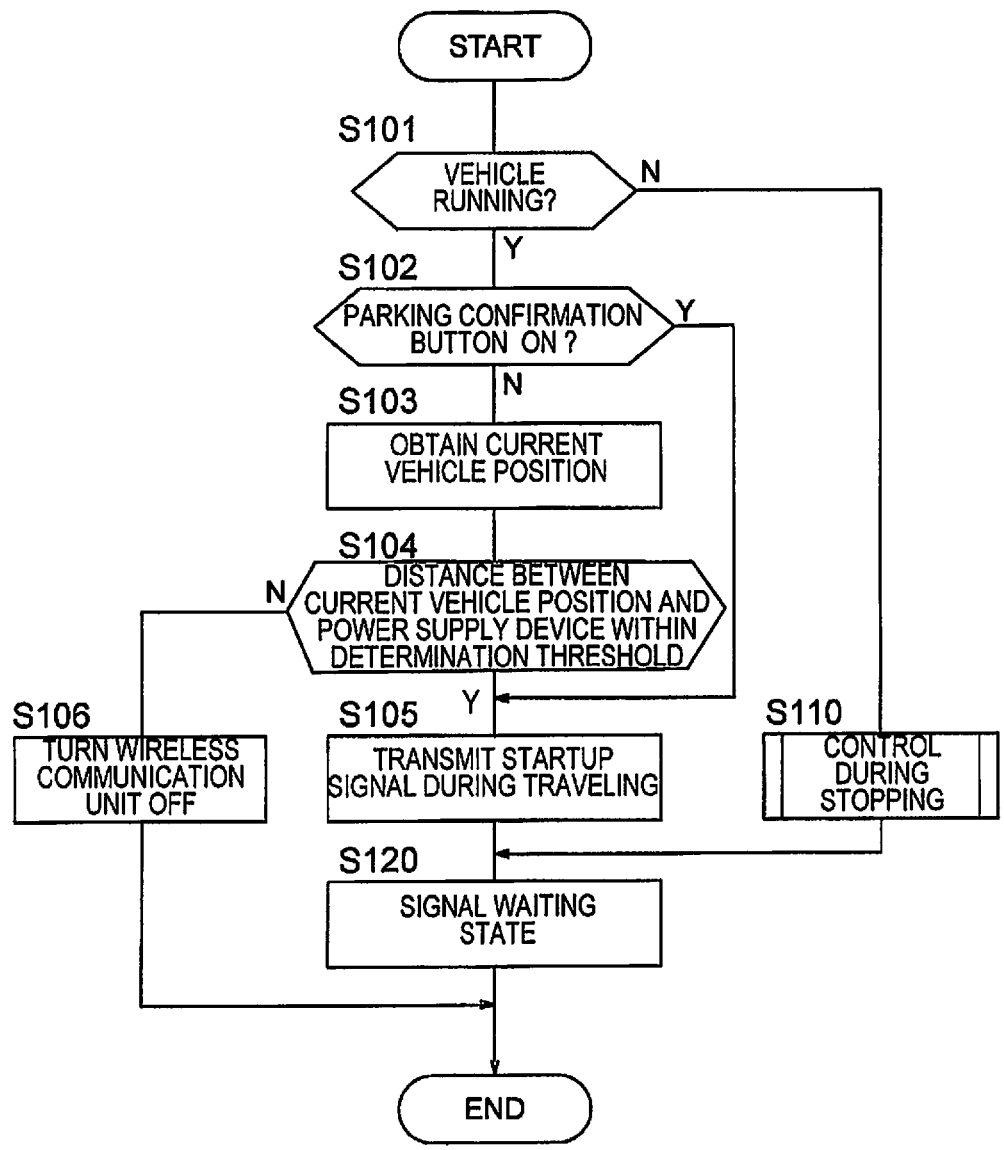
FIG. 6 is a flow chart illustrating the control flow of step S100 in FIG. 5.
Figure 7:
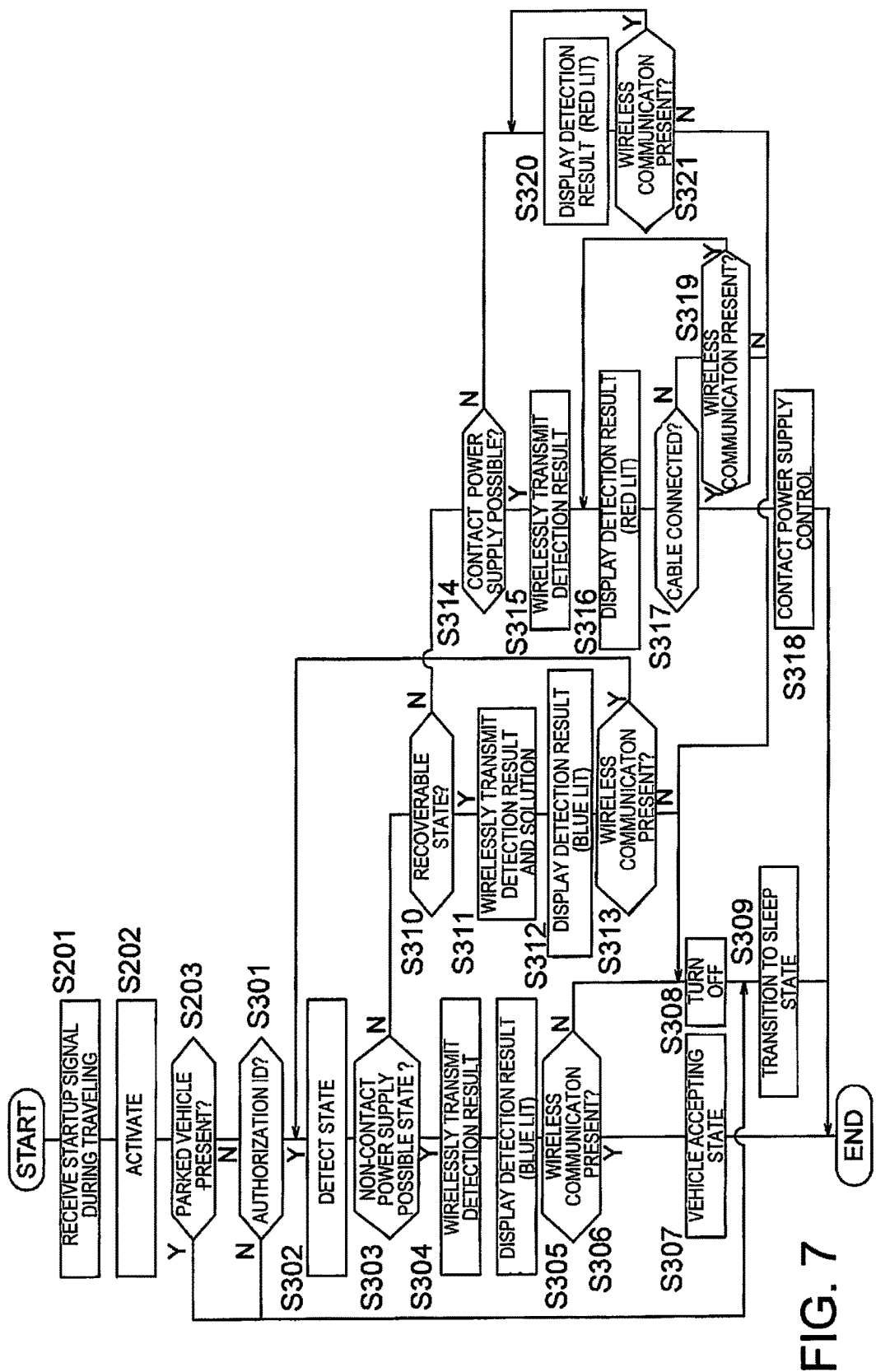
FIG. 7 is a flow chart illustrating the specific control flow of step S200 and step S300 in FIG. 5.
Figure 8:
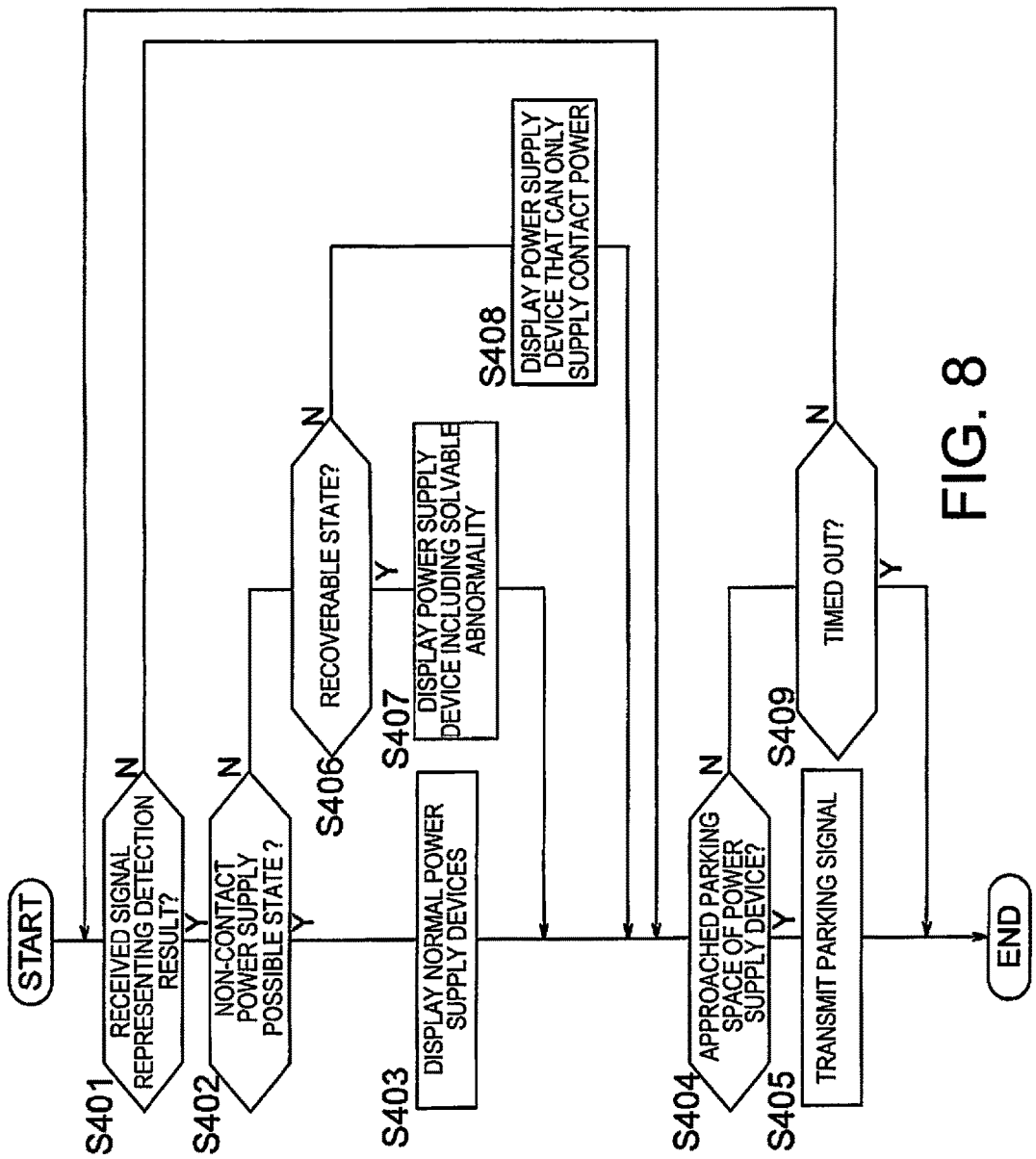
FIG. 8 is a flow chart illustrating the specific control flow of step S400 in FIG. 5.
Figure 9:
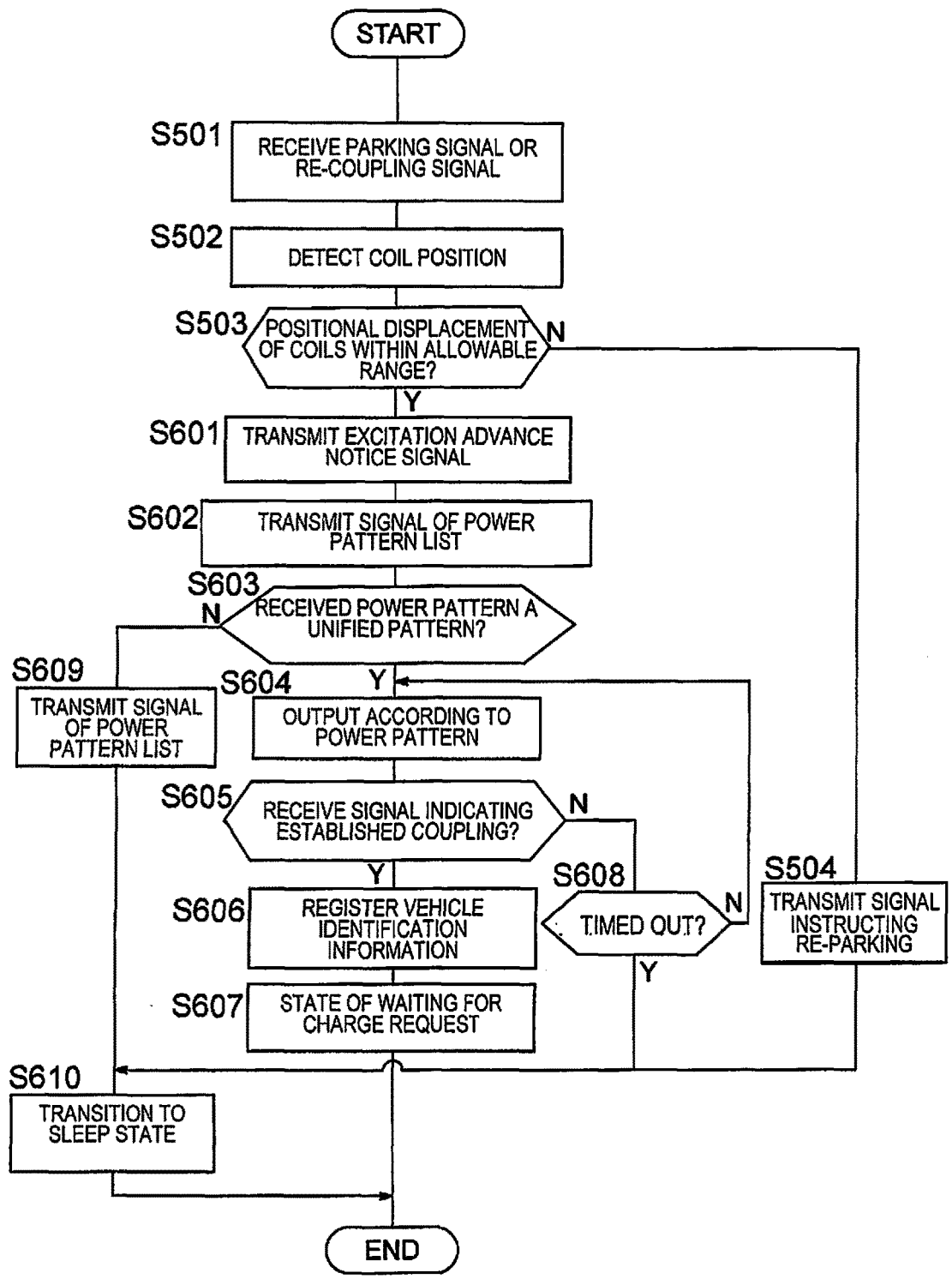
FIG. 9 is a flow chart illustrating the specific control flow of step S500 and the control flow of the power supply device side, among the controls of step S600, in FIG. 5.
Figure 10:
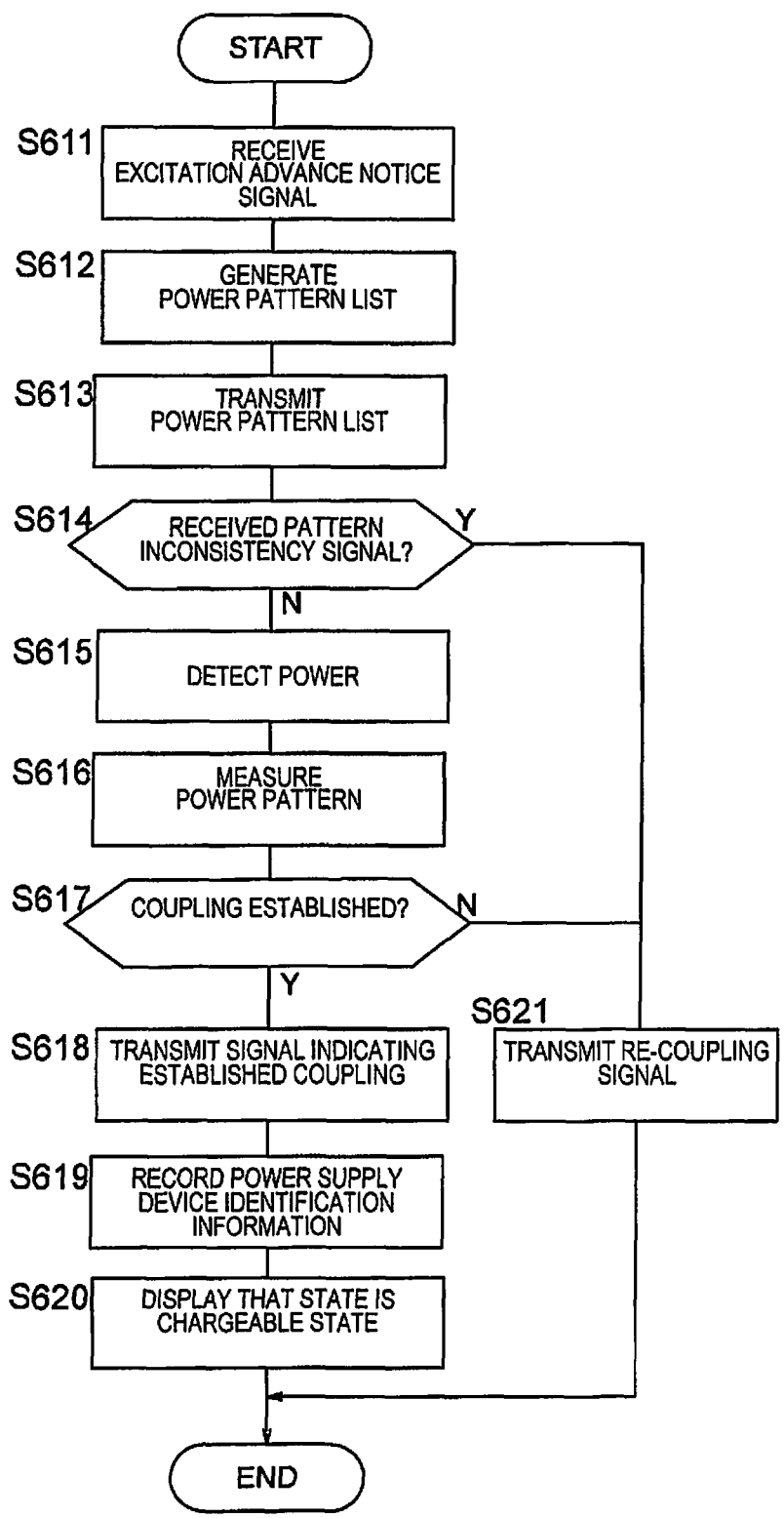
FIG. 10 is a flow chart illustrating the control flow of the vehicle side, among the controls of step S600, in FIG. 5.
Figure 11:
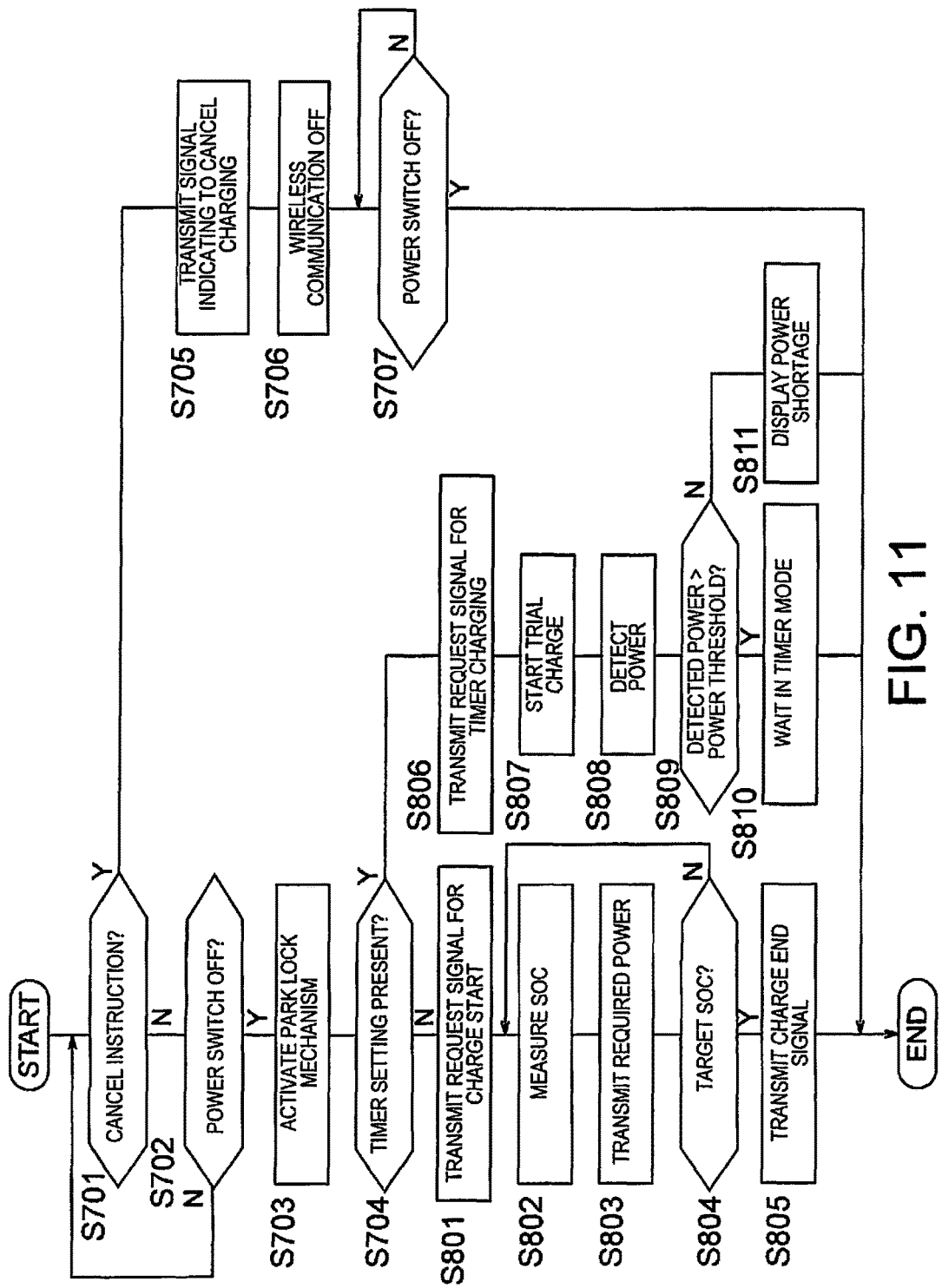
FIG. 11 is a flow chart illustrating the specific control flow of step S700 and the control flow of the vehicle side, among the controls of step S800, in FIG. 5.
Figure 12:
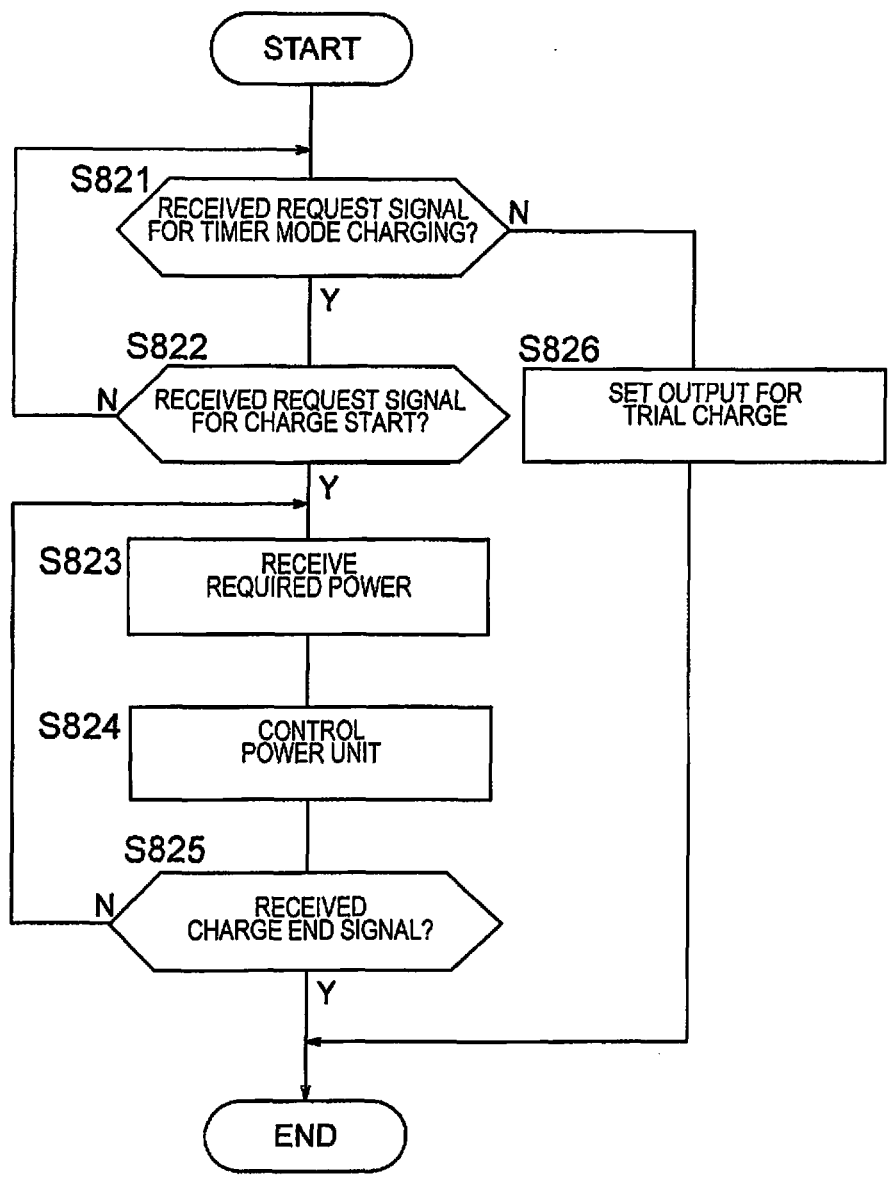
FIG. 12 is a flow chart illustrating the control flow of the power supply device side, among the controls of step S800, in FIG. 5.
Figure 13:
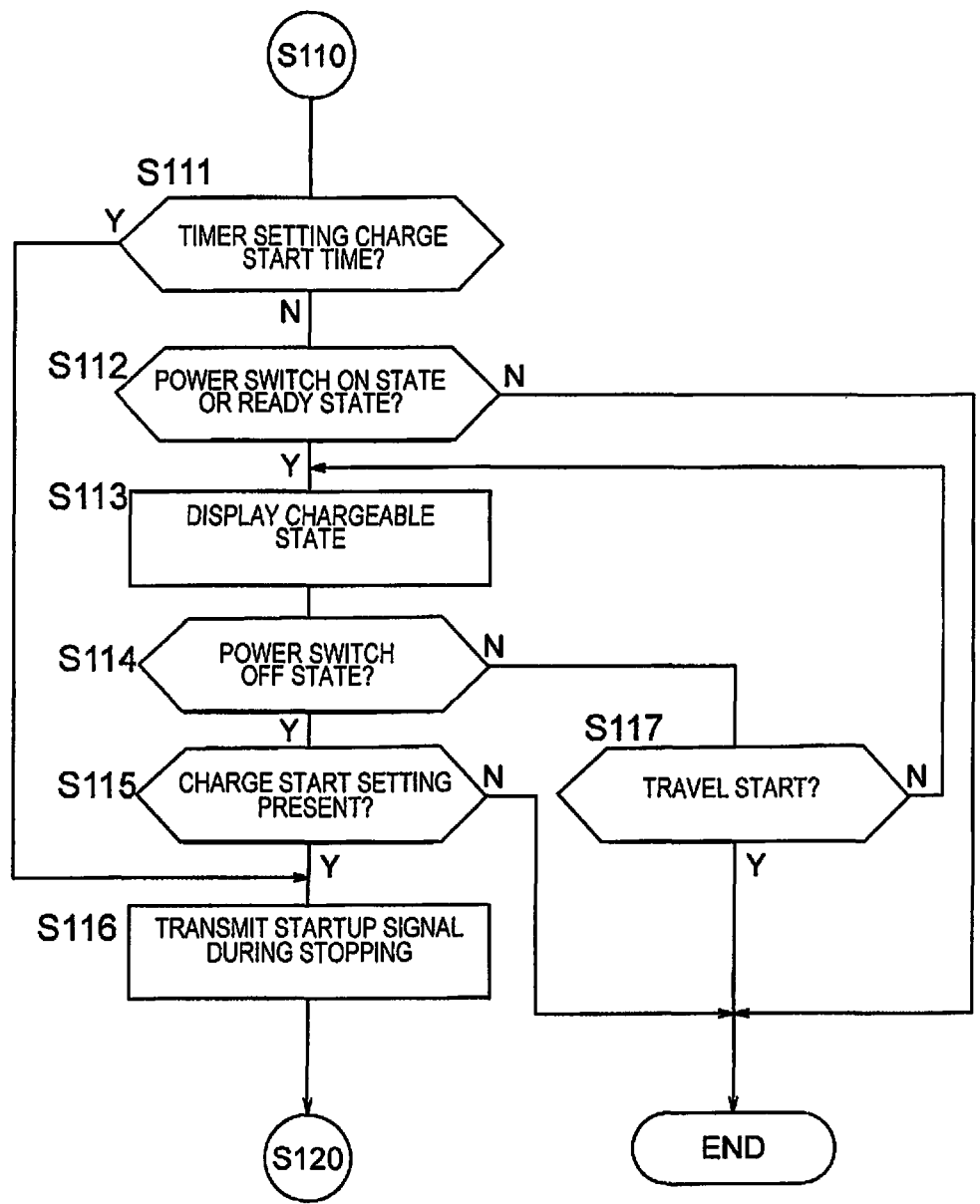
FIG. 13 is a flow chart illustrating the specific control flow of step S100 in FIG. 5, which is the control procedure of the controller in a stopped vehicle.
Figure 14:
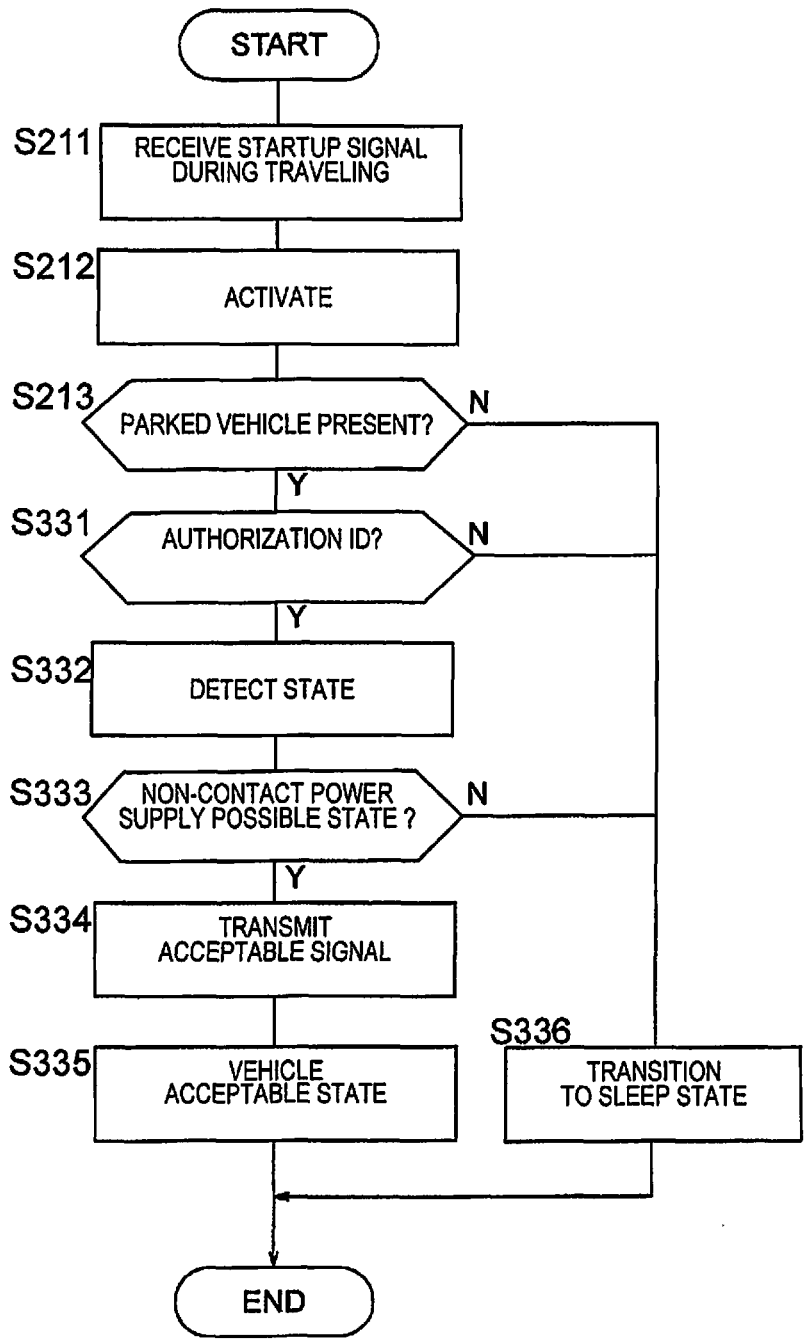
FIG. 14 is a flow chart illustrating the specific control flow of step S110 in FIG. 6.

The control of the power supply device side controller 10 and the vehicle side controller 20 will be described next, using FIG. 5-FIG. 13. FIG. 5 illustrates a general overview of the control flow of the controllers 10 and 20. FIG. 6 illustrates the specific control flow of step S100 in FIG. 5. FIG. 7 illustrates the specific control flow of step S200 and step S300 in FIG. 5. FIG. 8 illustrates the specific control flow of step S400 in FIG. 5. FIG. 9 illustrates the specific control flow of step S500 and the control flow of the power supply device side, among the controls of step S600, in FIG. 5. FIG. 10 illustrates the control flow of the vehicle side, among the controls of step S600, in FIG. 5. FIG. 11 illustrates the specific control flow of step S700 and the control flow of the vehicle side, among the controls of step S800, in FIG. 5. FIG. 12 illustrates the control flow of the power supply device side, among the controls of step S800, in FIG. 5. FIG. 13 illustrates the specific control flow of step S100 in FIG. 5, which is the control procedure of the controller 20 in a stopped vehicle. FIG. 14 illustrates the specific control flow of step S110 in FIG. 6.

In step S100, the vehicle side controller 20 performs a control for generating a startup signal and transmits the startup signal to the power supply device 1, as illustrated in FIG. 5. In step S200, the power supply device side controller 10 determines whether or not a vehicle is stopped in the parking space. In step S300, the controller 10 performs a self-diagnosis control for inside of the device, and transmits the diagnosis results to the vehicle 2 in accordance with the state of the power supply device 1.

In step S400, the controller 20 informs the state of the power supply device, based on the signal of the power supply device 1 side.

After the control of step S300, the controller 10 detects the coil position in step S500. After step S400 and after step S500, the controllers 10, 20 perform a coupling control. After step S600, the controller 20 performs a control to prepare for charging in step S700.

Then, after step S600 on the power supply device side and after step S700 on the vehicle side, the controllers 10, 20 perform a charging control and end the control.

In the control of step S100 in FIG. 5, the vehicle side controller 20 first determines whether or not the vehicle is traveling in step S101, as illustrated in FIG. 6. If the vehicle is traveling, the controller 20 determines whether or not the parking confirmation button 31 has been switched from OFF to ON, in step S102. If the parking confirmation button 31 has not been turned ON, the controller 20 acquires the current position of the vehicle with the GPS 28 (step S103).

The controller 20 measures the distance between the current position of the vehicle and the position of a registered power supply device 1 and determines whether or not the measured distance is equal to or less than a determination threshold, in step S104. Then, if the measured distance is equal to or less than the determination threshold, the controller 20 transmits a startup signal (traveling) with the startup signal control unit 202 (step S105).

Returning to step S102, even if the parking confirmation button 31 has been turned ON, the controller 20 transmits a startup signal (traveling) (step S105). Returning to step S101, if the vehicle is stopped, the controller 20 performs a control for when the vehicle is stopped, in step S110. The control for when the vehicle is stopped will be described below, with reference to FIG. 13.

Then, after step S105 or step S110, the controller 20 enters a state of waiting for a wireless signal from the power supply device 1 in step S120, and ends the control of step S100.

Returning to step S104, if the measured distance is longer than the determination threshold, the controller 20 switches the wireless communication unit 26 ON or OFF (step S106) and ends the control of the present embodiment.

In the control of step S200 in FIG. 5, the wireless communication unit 16 on the power supply device side first receives a startup signal (traveling) in step S201, as illustrated in FIG. 7. The controller 10 activates the systems other than the system relating to the reception of the wireless communication unit 16 from a sleep state, in step S202. The controller 10 determines whether or not a vehicle 2 is stopped in the parking space with the parked vehicle determination unit 101, in step S203. If there is no parked vehicle, the step proceeds to step S309 and the controller 10 transitions to a sleep state. When entering the sleep state, the control flow of the controllers 10 and 20 escapes from the control flow of FIG. 5. The above is the control of step S200, and below is the control of step S300.

If there is a parked vehicle, the controller 10 cross-checks the identification information of the vehicle included in the startup signal (traveling) and the identification information of permitted vehicles that are registered in the memory 15, in step S301. If the transmitted identification information of the vehicle is permitted, the controller 10 detects the state of the power supply device 1 by controlling the state detection unit 102 (step S302). The controller 10 determines whether or not the detection result of the state detection unit 102 is a non-contact power supply possible state, in step S303. If the detection result is a non-contact power supply possible state, the controller 10 wirelessly transmits the detection result, in step S304. The controller 10 sets the display state of the display unit 17 to a blue lit state, in step S305.

The controller 10 determines whether or not a wireless signal is continuously being received from the vehicle 2, in step S306. If the wireless communication is being continued, the controller 10 enters a state of accepting the vehicle in preparation for coupling (step S307), and ends the control of step S300.

Returning to step S306, when the wireless signal from the vehicle 2 disappears and the communication is interrupted, the controller 10 sets the display state of the display unit 17 to a turned off state, in step S308. The controller 10 enters a sleep state in step S309. That is, a time when the vehicle passes without stopping at the parking space corresponds to the controls of step S308, S309.

Returning to step S303, if the detection result of the state detection unit 102 is not a non-contact power supply possible state, the controller 10 determines whether or not the detection result of the state detection unit 102 is a recoverable state (step S310). If the detection result is a recoverable state, the controller 10 wirelessly transmits the detection result, in step S311. The controller 10 sets the display state of the display unit 17 to a blue blinking state, in step S312.

The controller 10 determines whether or not a wireless signal is continuously being received from the vehicle 2, in step S313. If wireless communication is being continued, the step returns to step S302. Then, when the recoverable state becomes the non-contact power supply possible state while looping the control flow of step S302-step S313, the step proceeds from step S303 to step S304.

On the other hand, if the wireless signal from the vehicle 2 has disappeared, the step proceeds to step S308.

Returning to step S310, if the detection result of the state detection unit 102 is not a recoverable state, the controller 10 determines whether or not the detection result of the state detection unit 102 is a contact power supply possible state (step S314). If the detection result is a contact power supply possible state, the controller 10 wirelessly transmits the detection result, in step S315. The controller 10 sets the display state of the display unit 17 to a red blinking state, in step S316.

The controller 10 determines whether or not a charging cable for a contact power supply has been connected to the charging port 32, in step S317. If a charging cable has been connected, the controller 10 starts the charging control by a contact power supply, in step S318. When performing a charging control of a contact power supply, the control flow of the controllers 10 and 20 escapes from the control flow of FIG. 7, and the flow is ended.

Returning to step S317, if a charging cable has not been connected, the controller 10 determines whether or not a wireless signal is continuously being received from the vehicle 2, in step S319. If wireless communication is being continued, the step returns to step S316. If the wireless signal from the vehicle 2 has disappeared, the step proceeds to step S308.

Returning to step S314, if the detection result of the state detection unit 102 is not a contact power supply possible state, the display state of the display unit 17 is set to a red lit state, in step S320. The controller 10 determines whether or not a wireless signal is continuously being received from the vehicle 2, in step S321. If a wireless communication is being continued, the step returns to step S320. If the wireless signal from the vehicle 2 has disappeared, the step proceeds to step S308.

Returning to step S301, if the transmitted identification information of the vehicle is permitted, the detection control by the state detection unit 102 described above is not performed and the display of the display unit 17 is kept off so as not to notify the state of the power supply device 1, and the step proceeds to step S309. The above is the control flow of step S300.

In the control of step S400 in FIG. 5, the vehicle side controller 20 first determines whether or not a signal representing the detection result of the state detection unit 102 has been received in step S401, as illustrated in FIG. 8. If a signal representing the detection result has been received, the controller 20 determines whether or not the state represented by the detection result is a non-contact power supply possible state, in step S402. If the state is a non-contact power supply possible state, the controller 20 displays on the display 25 the position of the power supply device 1 that is in a non-contact power supply possible state, and that the state is a non-contact power supply possible state, as a normal power supply device 1, with the power supply device guiding unit 203, in step S403.

The controller 20 determines whether or not the vehicle 2 has approached the power supply device 1 that is displayed on the display 25, in step S404. If the vehicle has approached the power supply device, the controller 20 transmits to the power supply device 1 a parking signal indicating the intention to park and ends the control of step S400, in step S405.

Returning to step S402, if the state represented by the detection result is not a non-contact power supply possible state, the controller 20 determines whether or not the state represented by the detection result is a recoverable state (step S406). If the state is a recoverable state, the controller 20 displays on the display 25 the position of the power supply device 1 that is in the recoverable state, and that the state is a recoverable state, as a power supply device that includes an abnormality that can be solved by the user, with the power supply device guide unit 203, in step S407. The step then proceeds to step S404.

Returning to step S406, if the state represented by the detection result is not a recoverable state, the controller 20 displays on the display 25 the position of the power supply device 1 that is in the contact power supply possible state, as a power supply device in which only charging by contact power supply is possible, with the power supply device guide unit 203, in step S408. The step then proceeds to step S404.

Then, if the vehicle 2 has not approached the power supply device that is displayed on the display 25 in step S404, the controller 20 determines whether or not a predetermined time has elapsed since entering the standby state according to step S120 of FIG. 6, in step S409. Then, if a predetermined time has elapsed, the control of step S400 is ended. On the other hand, if a predetermined time has not elapsed (has not timed out), the step returns to step S401. The control flow above is the control flow of step S400.

In the control of step S500 of FIG. 5, the power supply device side controller 10 first receives a parking signal (refer to step S405 in FIG. 8) or a re-coupling signal (refer to step S621 in FIG. 10) in step S501, as illustrated in FIG. 9. The controller 10 detects the position of the power reception coil 21 with the coil position detection unit 103, in step S501. The controller 10 determines whether or not the positional displacement between the coils is within the allowable range, in step S503. If the positional displacement between the coils is outside of the allowable range, the controller 10 transmits a signal to instruct re-parking to the vehicle 2 in step S504, and the controller 10 transitions to a sleep state in step S609. The above is the control of step S500, and below is the control of step S600.

If the positional displacement between the coils is within the allowable range in step S502, the controller 10 transmits an excitation advance notice signal (coupling advance notice signal), in step S601.

The controller 10 receives a signal containing a power pattern list, as a response signal with respect to the coupling advance notice signal, in step S602. The controller 10 determines whether or not the power pattern list is a unified pattern, by comparing the received power pattern list and the power pattern list that is recorded in the memory 15, in step S603.

If the power pattern list is a unified pattern, the controller 10 extracts the power pattern that corresponds to the identification information of itself (power supply device 1) from the received power pattern list, in step S604. Then, the controller 10 controls the power unit 13 and causes the non-contact power supply control unit 104 to output power according to the extracted power pattern from the power transmission coil 11.

The controller 10 determines whether or not a coupling established signal including the identification information of itself has been received, in step S605. If a coupling established signal has been received, the identification information of the vehicle with which coupling has been established is recorded in the memory 15, in step S606. In step S607, the controller 10 transmits a signal indicating an established coupling to the other vehicles, enters a state of waiting for a charge request from the vehicle 2 side, and ends the control of step S600.

Returning to step S605, if a coupling established signal has not been received, the controller 10 determines whether or not a predetermined time has elapsed since power was outputted in step S604, in step S608. If the predetermined time has elapsed, the coupling is considered to have failed, and the controller 10 transitions to a sleep state (step S610). On the other hand, if a predetermined time has not elapsed (has not timed out), the step returns to step S604.

Returning to step S603, if the received power pattern list is not a unified pattern, the controller 10 transmits a signal indicating a pattern inconsistency to the vehicle side, in step S609. The controller 10 transitions to a sleep state in step S610, and ends the control of step S600. The control flow above is the control flow of step S500 and S600 on the power supply device side.

In the control on the vehicle side of step S600 in FIG. 5, the controller 20 first receives an excitation advance notice signal in step S611, as illustrated in FIG. 10. The controller 20 generates a power pattern list with the coupling control unit 204 in accordance with a rule that is set in advance, using the identification information that is contained in the excitation advance notice signal, in step S612. The controller 20 transmits the power pattern list to the power supply device 1, in step S613.

The controller 20 determines whether or not a signal indicating a pattern inconsistency has been received, in step S614. If a signal indicating a pattern inconsistency has not been received, the controller 20 detects the power that is received by the power reception coil 21 using the sensor 22, in step S615. The controller 20 measures the power pattern from the detected power, in step S616. The controller 20 compares the measured power pattern and the power pattern in the power pattern list to determine whether or not a coupling has been established based on the comparison result, in step S617.

If a coupling has been established, the controller 20 transmits a signal indicating an established coupling to the power supply device 1, in step S618. The controller records the identification information of the power supply device 1 with which a coupling has been established in the memory 29, in step S619. The controller 20 displays on the display 25 that the state is one in which charging by a non-contact power supply is possible, in step S620. Then, the control of step S600 on the vehicle side is ended.

Returning to step S617, if a coupling has not been established, the controller 20 transmits a re-coupling signal for performing a coupling control again to the power supply device 1, in step S621. Returning to step S614, if a signal indicating a pattern inconsistency has been received, the controller 20 transmits a re-coupling signal to the power supply device 1, in step S621. The control flow above is the control flow of step S600 on the vehicle side.

In the control of step S700 of FIG. 5, the controller 20 first determines whether or not an instruction to cancel the charging of the battery 24 has been inputted based on an operation of the user, when a screen informing charge start is being displayed (corresponding to step S620), in step S701, as illustrated in FIG. 11. If there is no cancel instruction, the controller 20 determines whether or not the power switch is in an OFF state, in step S702. If the power switch is not in an OFF state, the step returns to step S701.

On the other hand, if the power switch is in an OFF state, the controller 20 actuates the park lock mechanism 34, in step S703. The controller 20 determines whether or not a timer mode for charging has been set, in step S704. If a timer mode has not been set, the step proceeds to step S801, and if a timer mode has been set, the step proceeds to step S806.

Returning to step S701, if there is a cancel instruction, the controller 20 transmits a signal indicating to cancel the charging to the power supply device 1, in step S705. The controller 20 turns OFF the wireless communication by the wireless communication unit 26, in step S706. The controller 20 determines whether or not the power switch is in the OFF state, in step S707. If the power switch is in the OFF state, the control of the present embodiment is ended. On the other hand, if the power switch is not in the OFF state, the controller 20 waits until the power switch is in the OFF state. The control flow above is the control flow of step S700. The control flow of step S800 on the vehicle side will be described below.

Returning to step S704, if a timer is not set, the controller 20 transmits a request signal to start the charging to the power supply device 1, in step S801. The controller 20 measures the SOC of the battery 24, in step S802. The controller 20 calculates a required power for charging the battery 24 with a charging power that is suitable for charging the battery 24, in accordance with the SOC of the battery 24, in step S803. Then, the controller 20 transmits the calculated required power to the power supply device 1.

The controller 20 determines whether or not the SOC of the battery 24 has reached the target SOC, in step S804. If the SOC has reached the target SOC, the controller 20 transmits a charge end signal to the power supply device 1 in step S805, and ends the control of the present embodiment. On the other hand, if the SOC has not reached the target SOC, the step returns to step S802.

Returning to step S704, if a timer is set, the controller 20 transmits a request signal for performing charging in the timer mode to the power supply device 1 (step S806). The controller 20 starts a trial charge with the power that is outputted from the power transmission coil 11, in step S807. The controller 20 detects the power of the power reception coil 21 during the trial charge, in step S808. The controller 20 compares the detected power and a power threshold that is set in advance, in step S809. Then, if the detected power is greater than the power threshold, the controller 20 waits in the timer mode, in step S810. On the other hand, if the detected power is equal to or less than the power threshold, the controller 20 displays on the display 25 that there is a power shortage due to a positional displacement of the coils, in order to prompt the user to re-park (step S811). The control flow above is the control flow of step S800 on the vehicle side.

In the control on the power supply device side of step S800 in FIG. 5, the controller 10 determines whether or not a request signal for timer mode charging has been received in step S821, as illustrated in FIG. 12. If a request signal for timer mode charging has not been received, the controller 10 determines whether or not a request signal for charge start has been received. If a request signal for charge start has not been received, the step returns to step S821.

If a request signal for charge start has been received, the controller 10 receives the required power for charging the battery from the vehicle side, in step S823. The controller 20 controls the power unit 13 to cause the non-contact power supply control unit 104 to output the required power from the power transmission coil 11, in step S824.

The controller 10 determines whether or not a signal indicating a charge end has been received, in step S825. If a charge end signal has been received, the control of the present embodiment is ended. On the other hand, if a charge end signal has not been received, the step returns to step S823.

Returning to step S821, if a request signal for timer mode charging has been received, the controller 20 controls the power unit 13 to cause the non-contact power supply control unit 104 to output the power for trial charge from the power transmission coil 11 for a predetermined time (step S826). The control flow above is the control flow of step S800 on the power supply device side.

The control of step S110 in FIG. 6, and the control when a vehicle that is stopped transmits a startup signal (stopped) (corresponding to step S100 in FIG. 5) will be described next, using FIG. 13. In the control of step S110, the controller 20 first determines whether or not the time is the charge start time that is set in the timer mode for charging, in step S111.

On the other hand, if the time is not the charge start time, the controller 20 determines whether the state of the power switch is the ON state or the Ready state, in step S112. If the state of the power switch is the ON state or the Ready state, the controller 20 displays on the display 25 that the state is one in which charging by non-contact power supply is possible, in step S113. The controller 20 determines whether or not the state of the power switch is the OFF state, in step S114. If the power switch is in the OFF state, the controller 20 determines whether or not charging is set to start, in step S115. Charge start is set by a command to start charging being inputted to the controller 20 by an operation of the user, when a guide screen for the charge start is being displayed (corresponding to step S113).

If the charge start is set, the controller 20 transmits a startup signal (stopped) to the power supply device 1 with the startup signal control unit 202, in step S116. Then, after ending the control of step S110, the step proceeds to step S120.

Returning to step S115, if charge start is not set, the control of the present embodiment is ended.

Returning to step S114, if the power switch is not in the OFF state, the controller 20 determines whether or not the vehicle has started running, in step S117. If the vehicle is running, charging by non-contact charging is not performed; therefore, the control of the present embodiment is ended. On the other hand, if the vehicle is not running, the step returns to step S113.

Returning to step S112, if the power switch is not in the ON state or the Ready state, the control of the present embodiment is ended.

Returning to step S111, if the time is the charge start time of the timer mode, the controller 20 transmits a startup signal (stopped) to the power supply device 1 with the startup signal control unit 202, in step S116. The control flow above is the control flow of step S110.

In the control of step S200 in FIG. 5, the wireless communication unit 16 on the power supply device side first receives a startup signal (stopped) in step S211, as illustrated in FIG. 14. The controller 10 activates the systems other than the system relating to the reception of the wireless communication unit 16 from a sleep state, in step S212. The controller 10 determines whether or not a vehicle is stopped in the parking space with the parked vehicle determination unit 101, in step S213. If there is no parked vehicle, the step proceeds to step S336 and the controller 10 transitions to a sleep state. The above is the control of step S200, and below is the control of step S300.

If there is a parked vehicle, the controller 10 cross-checks the identification information of the vehicle included in the startup signal (stopped) and the identification information of permitted vehicles that are registered in the memory 15, in step S331. If the transmitted identification information of the vehicle is permitted, the controller 10 detects the state of the power supply device 1 by controlling the state detection unit 102 (step S332). The controller 10 determines whether or not the detection result of the state detection unit 102 is a non-contact power supply possible state, in step S333.

If the state is a non-contact power supply possible state, the controller 10 transmits an acceptable signal for charging by non-contact charging to the vehicle side, in step S334. Then, the controller 10 enters a state of accepting the vehicle in preparation for coupling (step S335), and ends the control of step S300.

Returning to step S333, if the state is not a non-contact power supply possible state, the controller 10 enters a sleep state in step S336. Returning to step S331, if the transmitted identification information of the vehicle is not permitted, the controller 10 enters a sleep mode in step S336.

As described above, in the present embodiment, when the state detection unit 102 detects a non-contact power supply possible state, the display unit 17 or the display 25 is displayed in a first display state (corresponding to "blue lit", or, corresponding to a pop-up display on the display 25 indicating that the power supply device 1 is normal), and when the state detection unit 102 does not detect a non-contact power supply possible state, the state is set to a state that is different from the first display state (corresponding to "blue blinking," "red blinking," "red lit," or "no display"). Thus, in the present embodiment, since the state of the power supply device 1 is notified after activating the power supply device 1 by wireless communication, the user can grasp the state of the power supply device 1 before parking the vehicle 2 in a chargeable area.

Additionally, in the present embodiment, if the state detection unit 102 detects a recoverable state, the display unit 17 or the display 25 is displayed in a second display state (corresponding to "blue blinking," or, corresponding to a pop-up display on the display 25 indicating that the state is a recoverable state). Thus, if the power supply device 1 has an abnormality that can be solved by the user, the state of the power supply device 1 is notified so that charging will be performed after the user solves the abnormality; as a result, the options of the power supply devices 1 that are capable of providing non-contact charging to the user can be expanded.

Additionally, in the present embodiment, if the state detection unit 102 detects a contact power supply possible state, the display unit 17 or the display 25 is displayed in a third display state (corresponding to "red blinking," or, corresponding to a pop-up display on the display 25 indicating that only contact power supply is possible). If the power supply device 1 is only capable of contact power supply, the options of power supply devices 1 that are capable of supplying power to the user can be expanded, by notifying the state of the power supply device 1.

Additionally, in the present embodiment, if the state detection unit 102 detects a power supply disabled state, the display unit 17 is displayed in a fourth display state (corresponding to "red lit"). Thus, in the present embodiment, the user is able to grasp that the power supply device 1 is in a power supply disabled state before parking the vehicle 2 in a chargeable area.

Additionally, in the present embodiment, if the state detection unit 102 detects a power supply disabled state, the detection result of the power supply disabled state is not wirelessly transmitted to the vehicle side. Since a power supply device that is not capable of supplying power is not notified to the vehicle side, the user of the vehicle 2 erroneously parking the vehicle 2 in a parking space with a power supply device that is not capable of supplying power can thereby be prevented.

Additionally, in the present embodiment, the state of the power supply device 1 is not displayed on the display unit 17 or the display 25 if the identification information of the vehicle 2 that is stored in the memory 15 and the identification information contained in the signal that is received by wireless communication do not match. Since the state of the power supply device is not notified with respect to unpermitted identification information, the user erroneously parking the vehicle 2 in a parking space with a power supply device that is not capable of supplying power can thereby be prevented.

In the present embodiment, the parking confirmation button 31 may be displayed on the display 25 as a parking button, and does not necessarily have to be a switch for activating a parking assist system. The button only needs to be at least one that is operated by a user with the intention to park a vehicle, when parking, or before parking, a running vehicle in a predetermined position.

Additionally, in the present embodiment, the required power was calculated by the vehicle side controller 20 when charging the battery 24 by the non-contact power supply; however, for example, the vehicle side controller 20 may transmit information about the battery 24 to the power supply device 1, and the power that is suitable for the state of the battery 24 may be calculated by the power supply device side controller 10, based on the received battery information.

Furthermore, the control flow of steps S331-S334 in the present embodiment may be omitted.

Additionally, when applying a hybrid vehicle as the vehicle 2 in the present embodiment, the power switch shall be replaced by an ignition switch for starting the engine. The sensor 22 may be connected between the battery 24 and the power reception circuit 23.

The notification of the state of the power supply device 1 may be notified by voice or sound, instead of the display by the display unit 17 or the display 25.

The wireless communication units 16, 26 described above correspond to the "communication circuit" recited in the claims; the display unit 17 or the display 25 corresponds to the "power supply device state notification unit" recited in the claims; the sensor 12, the self-diagnosis circuit 14, or the state detection unit 102 corresponds to the "detection circuit" recited in the claims; the controller 10 corresponds to the "controller" recited in the claims; the memory 15 corresponds to the "recording medium" recited in the claims; the controller 20 corresponds to the "vehicle side controller" recited in the claims; and the controller 10 corresponds to the "power supply device side controller" recited in the claims.

The invention claimed is:

1. A power supply device configured to supply electric power to a power reception coil of a vehicle in a non-contact manner by at least a magnetic coupling, the power supply device comprising:
    a power transmission coil arranged and configured to receive the electric power from a power source, and to supply the electric power to the power reception coil of the vehicle in the non-contact manner;
    a communication circuit configured to communicate with a vehicle communication circuit of by wireless communication;
    a detection circuit configured to detect a state of the power supply device;
    a power supply device state notification unit;
    a controller operatively coupled to the communication circuit, the detection circuit, and the power supply device notification unit, the controller being configured to control the power supply device state notification unit based on the state detected by the detection circuit upon a traveling-state startup signal being received by the communication circuit from the vehicle communication circuit while the vehicle is traveling before parking;
    the controller being configured to determine whether the power supply device is in a non-contact power supply possible state in which the electric power can be supplied from the power transmission coil to the power reception coil in the non-contact manner based on the state detected by the detection circuit, and to set a notification state of the power supply device state notification unit before the vehicle parks, the controller setting the notification state to a first notification state when the detection circuit detects the non-contact power supply possible state, and setting the notification state to a state that is different from the first notification state when the detection circuit is not detecting the non-contact power supply possible state.

2. The power supply device according to claim 1, wherein the detection circuit is configured to detect a recoverable state, which represents a state in which a user of the vehicle is able to recover from a state in which the power cannot be supplied in the non-contact manner to the non-contact power supply possible state, and
    the controller is configured to set the notification state of the power supply device state notification unit to a second notification state when the detection circuit detects the recoverable state.

3. The power supply device according to claim 1, further comprising
    a contact power supply circuit configured to supply power via a charging cable that is connected to the vehicle,
    the detection circuit being configured to detect a contact power supply possible state, which represents a state in which the power cannot be supplied in the non-contact manner and the power is supplieable by the contact power supply circuit, and
    the controller being configured to set the notification state of the power supply device state notification unit to a second notification state when the detection circuit detects the contact power supply possible state.

4. The power supply device according to claim 1, wherein the detection circuit is configured to
    detect a recoverable state, which represents a state in which a user of the vehicle is able to recover from a state in which power cannot be supplied in the non-contact manner to the non-contact power supply possible state, and
    detect a power supply disabled state, which represents a state that is not the recoverable state and is a state in which a battery of the vehicle cannot be charged by the power supply device, and
    the controller is configured to set the notification state of the power supply device state notification unit to a second notification state when the detection circuit detects the power supply disabled state.

5. The power supply device according to claim 4, wherein the controller is configured not to transmit a detection result indicating the state detected by the detection circuit to the vehicle when the detection circuit has detected the power supply disabled state.

6. The power supply device according to claim 1, further comprising
    a recording medium configured to record identification information corresponding to the vehicle,
    the communication circuit being configured to receive a signal containing the identification information from the vehicle by wireless communication while the vehicle is traveling, and
    the controller being configured not to notify a user of the vehicle regarding the state of the power supply device by controlling the power supply device state notification unit when the identification information that is recorded on the recording medium and the identification information that is contained in the signal received by the communication circuit do not match.

7. A non-contact power supply system that supplies power between a power reception coil provided in a vehicle and a power transmission coil provided in a power supply device in a non-contact manner by at least a magnetic coupling, the non-contact power supply system comprising:
    the vehicle, the vehicle having a vehicle communication circuit configured to transmit a startup signal for activating the power supply device from the vehicle to the power supply device by wireless communication while the vehicle is traveling before parking;

a power supply device state notification unit; and a vehicle side controller configured to control the vehicle communication circuit and the power supply device state notification unit, the power supply device comprising:

a power supply device side communication circuit configured to receive the startup signal;

a detection circuit configured to detect the state of the power supply device in response to the startup signal; and a power supply device side controller configured to transmit a signal containing a detection result indicating the state detected by the detection circuit by controlling the power supply device side communication circuit; and the detection circuit being configured to detect a non-contact power supply possible state, which represents a state in which power is suppliable from the power transmission coil in a non-contact manner, the vehicle side controller being configured to set a notification state of the power supply device state notification unit before the vehicle parks, the vehicle side controller setting the notification state to a first notification state when the detection circuit detects the non-contact power supply possible state, and setting the notification state to a state that is different from the first notification state when the detection circuit is not detecting the non-contact power supply possible state.

8. The power supply device according to claim 2, further comprising a contact power supply circuit configured to supply power via a charging cable that is connected to the vehicle, the detection circuit being configured to detect a contact power supply possible state, which represents a state in which the power cannot be supplied in the non-contact manner and the power can be supplied by the contact power supply circuit, and the controller being configured to set the notification state of the power supply device state notification unit to a third notification state when the detection circuit detects the contact power supply possible state.

9. The power supply device according to claim 2, wherein the detection circuit is configured to detect a recoverable state, which represents a state in which the user of the vehicle is able to recover from a state in which power cannot be supplied in the non-contact manner to the non-contact power supply possible state, and detect a power supply disabled state, which represents a state that is not the recoverable state and is a state in which a battery of the vehicle cannot be charged by the power supply device, and the controller is configured to set the notification state of the power supply device state notification unit to a third notification state when the detection circuit detects the power supply disabled state.

10. The power supply device according to claim 9, wherein the controller is configured not to transmit a detection result indicating the state detected by the detection circuit to the vehicle when the detection circuit has detected the power supply disabled state.

11. The power supply device according to claim 2, further comprising a recording medium configured to record identification information of the vehicle, the communication circuit being configured to receive a signal containing the identification information from the vehicle by wireless communication while the vehicle is traveling, and the controller being configured not to notify the user of the vehicle regarding the state of the power supply device by controlling the power supply device state notification unit when the identification information that is recorded on the recording medium and the identification information that is contained in the signal received by the communication circuit do not match.

12. The power supply device according to claim 3, further comprising a recording medium configured to record identification information of the vehicle, the communication circuit being configured to receive a signal containing the identification information from the vehicle by wireless communication while the vehicle is traveling, and the controller being configured not to notify a user of the vehicle regarding the state of the power supply device by controlling the power supply device state notification unit when the identification information that is recorded on the recording medium and the identification information that is contained in the signal received by the communication circuit do not match.

13. The power supply device according to claim 4, further comprising a recording medium configured to record identification information of the vehicle, the communication circuit being configured to receive a signal containing the identification information from the vehicle by wireless communication while the vehicle is traveling, and the controller being configured not to notify the user of the vehicle regarding the state of the power supply device by controlling the power supply device state notification unit when the identification information that is recorded on the recording medium and the identification information that is contained in the signal received by the communication circuit do not match.

14. The power supply device according to claim 5, further comprising a recording medium configured to record identification information of the vehicle, the communication circuit being configured to receive a signal containing the identification information from the vehicle by wireless communication while the vehicle is traveling, and the controller being configured not to notify the user of the vehicle regarding the state of the power supply device by controlling the power supply device state notification unit when the identification information that is recorded on the recording medium and the identification information that is contained in the signal received by the communication circuit do not match.

15. The power supply device according to claim 3, wherein the detection circuit is configured to detect a recoverable state, which represents a state in which a user of the vehicle is able to recover from a state in which power cannot be supplied in the non-contact manner to the non-contact power supply possible state, and detect a power supply disabled state, which represents a state that is not the recoverable state and is a state in which a battery of the vehicle cannot be charged by the power supply device, and the controller is configured to set the notification state of the power supply device state notification unit to a third notification state when the detection circuit detects the power supply disabled state.

\* \* \* \* \*